(12) United States Patent
Hirasawa et al.

(10) Patent No.: US 6,314,467 B1
(45) Date of Patent: *Nov. 6, 2001

(54) METHOD OF SENDING AND RECEIVING INFORMATION AND SYSTEM USING SUCH METHOD

(75) Inventors: Shigeki Hirasawa, Sagamihara; Michio Morioka, Kashiwa; Tadashi Kuwabara, Yokohama; Tomochika Ozaki, Yokohama; Yuichi Yagawa, Yokohama; Akio Yajima, Tokyo, all of (JP)

(73) Assignee: Hitachi, Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/989,324

(22) Filed: Dec. 11, 1997

(30) Foreign Application Priority Data

Dec. 13, 1996 (JP) .................................................. 8-333847

(51) Int. Cl.[7] ...................................................... G06F 15/16

(52) U.S. Cl. ........................... 709/236; 709/225; 709/229; 709/232; 709/236

(58) Field of Search .................................. 709/225, 229, 709/232, 236, 237

(56) References Cited

U.S. PATENT DOCUMENTS

| 4,366,479 | | 12/1982 | Mori et al. . | |
|---|---|---|---|---|
| 5,220,596 | * | 6/1993 | Patel | 379/94 |
| 5,347,632 | * | 9/1994 | Filepp et al. | 709/200 |
| 5,655,079 | * | 8/1997 | Hirasawa et al. | 395/200.01 |
| 5,659,583 | * | 8/1997 | Kawano et al. | 395/610 |
| 5,706,507 | * | 1/1998 | Schloss | 395/615 |
| 5,794,210 | * | 8/1998 | Goldhaber et al. | 705/14 |
| 5,802,299 | * | 9/1998 | Logan et al. | 709/218 |
| 5,835,087 | * | 11/1998 | Herz et al. | 3456/327 |
| 5,913,040 | * | 6/1999 | Rakavy | 709/231 |
| 5,918,014 | * | 6/1999 | Robinson | 709/219 |

FOREIGN PATENT DOCUMENTS

| 0537481 | 4/1993 | (EP) . |
|---|---|---|
| 9621977 | 7/1996 | (WO) . |

OTHER PUBLICATIONS

P. Resnick, et al, PICS: Internet Access Controls with Censorship, Communications of the ACM, Oct. 1, 1996, vol. 39, No. 10, pp. 87–93.

* cited by examiner

*Primary Examiner*—Robert B. Harrell
*Assistant Examiner*—Stephan Willett
(74) *Attorney, Agent, or Firm*—Antonelli, Terry, Stout & Kraus, LLP

(57) ABSTRACT

In an information sending and receiving system in which an information sending equipment and at least one information receiving equipment send and receive information through a transmission medium, a management message is sent from the information sending equipment to the information receiving equipment thereby to create a list of a content code expressing a data message registered on the information receiving equipment side within the information receiving equipment. Then, a data message containing a content code and data is transmitted from the information sending equipment to the information receiving equipment. The information receiving equipment selects a data message by comparing a content code of a data message and a list of its own content code. The content code list may be created within the information sending equipment based on a property value in an answer message from the information receiving equipment.

29 Claims, 38 Drawing Sheets

| DATA NUMBER | DATA NAME | CATEGORY | DATA FILE NAME |
|---|---|---|---|
| 10001 | AAA CHOCOLATE | CONFECTIONERY | 13001.html |
| 10002 | BBB WHISKEY | ALCOHOLIC DRINKS | 13002.html |
| 10003 | CCC CRAB | FROZEN FOOD | 13003.html |
| : | : | : | : |

FIG. 12

| PROPERTY CODE | PROPERTY NAME | PROPERTY VALUE LIMIT |
|---|---|---|
| 1001 | AGE | 0 OR POSITIVE INTEGER |
| 1002 | SEX | {MALE, FEMALE} |
| 1003 | ADDRESS | WITHIN 40 TWO-BYTE CHARACTERS |
| 1004 | TENNIS | {YES, NEITHER YES NOR NO, NO} |
| 1005 | ALCOHOLIC DRINKS | {YES, NEITHER YES NOR NO, NO} |
| 1006 | TOBACCO | {YES, NEITHER YES NOR NO, NO} |
| : | : | : |

FIG. 13

| TERM CODE | TERM NAME | TERM DEFINITION |
|---|---|---|
| 2001 | TWENTIES | 20≦AGE<30 |
| 2002 | THIRTIES | 30≦AGE<40 |
| 2003 | TOKYO | include "TOKYO" in ADDRESS |
| 2004 | YOUNG PEOPLE | 10≦AGE<30 |
| : | : | : |

FIG. 14

◆ STRATEGY MANAGER (STRATEGY MANAGER)

| MERCHANDISE (DATA) NAME | MERCHANDISE (DATA) NUMBER | |
|---|---|---|
| AAA CHOCOLATE | 10001 | ↓ |

| PROPERTY ITEM | PROPERTY VALUE (TERM) |
|---|---|
| SEX ↓ | FEMALE ↓ |
| ADDRESS ↓ | TOKYO ↓ |
| AGE ↓ | TWENTIES ↓ |

SEX
AGE
ADDRESS

TWENTIES
THIRTIES
FOURTIES

| EVENT NUMBER | SENDING TIME |
|---|---|
| 13 | 96 / 12 / 03 / 00 : 00 : 00 |

[CANCEL]  [DONE]  [HELP]

FIG. 15

| STRATEGY NUMBER | DATA NUMBER | CONTENT CODE | EVENT NUMBER | SENDING TIME |
|---|---|---|---|---|
| 4001 | 10001 | 102 | 13 | 96 / 11 / 03 : 00 : 00 |
| 4002 | 10002 | 101 | 13 | 96 / 11 / 03 : 00 : 00 |
| 4003 | 10003 | 099 | 13 | 96 / 11 / 03 : 00 : 00 |
| 4004 | 10004 | 104 | 14 | IMMEDIATELY |
| : | : | : | : | : |

FIG. 16

| CONTENT CODE | STRATEGY CONDITION | STATE | REGISTRATION TIME | PAUSE TIME | RESUME TIME | DELETE TIME |
|---|---|---|---|---|---|---|
| 001 | (REGISTER CONTENT CODE) | REGISTER | 96/10/01 : 00 : 00 | — | — | — |
| 002 | (DELETE CONTENT CODE) | REGISTER | 96/10/01 : 00 : 00 | — | — | — |
| 003 | (PAUSE CONTENT CODE) | REGISTER | 96/10/01 : 00 : 00 | — | — | — |
| 004 | (RESUME CONTENT CODE) | REGISTER | 96/10/01 : 00 : 00 | — | — | — |
| 005 | (CHANGE CONTENT CODE) | REGISTER | 96/10/01 : 00 : 00 | — | — | — |
| : | : | : | : | : | : | : |
| 011 | (REGISTER PROPERTY ITEM) | REGISTER | 96/10/01 : 00 : 00 | — | — | — |
| 012 | (DELETE PROPERTY ITEM) | REGISTER | 96/10/01 : 00 : 00 | — | — | — |
| : | : | : | : | : | : | : |
| 021 | (REGISTER TERM) | REGISTER | 96/10/01 : 00 : 00 | — | — | — |
| 022 | (DELETE TERM) | REGISTER | 96/10/01 : 00 : 00 | — | — | — |
| : | : | : | : | : | : | : |
| 099 | (UNCONDITIONAL "BROADCAST") | REGISTER | 96/10/01 : 00 : 00 | — | — | — |
| : | : | : | : | : | : | : |
| 101 | THIRTIES & SEX=MALE | REGISTER | 96/11/01 : 00 : 00 | 97/05/01 : 00 : 00 | — | 98/05/01 : 00 : 00 |
| 102 | TWENTIES & SEX =FEMALE & TOKYO | REGISTER | 96/11/01 : 00 : 00 | 97/01/01 : 00 : 00 | — | 98/01/01 : 00 : 00 |
| 103 | ALCOHOLIC DRINKS =YES & SEX =FEMALE & TOKYO | PAUSE | 96/11/01 : 00 : 00 | 97/12/01 : 00 : 00 | — | 97/12/01 : 00 : 00 |
| 104 | LIVE IN KANTO AREA | REGISTER | 96/11 : 02 : 00 : 00 | — | — | — |
| 105 | ALCOHOLIC DRINKS =YES & SEX =MALE & TOKYO | REGISTER | 96/11/02 : 00 : 01 | 97/01/01 : 00 : 00 | — | 98/01/01 : 00 : 00 |
| 106 | ALCOHOLIC DRINKS =YES & SEX =FEMALE & TOKYO | REGISTER | 96/12/01 : 00 : 00 | 97/05/01 : 00 : 00 | — | 98/05/01 : 00 : 00 |
| : | : | : | : | : | : | : |

FIG. 17

| 1151 | 1152 | 1153 | 1154 | 1155 | 1156 |
|---|---|---|---|---|---|
| CONTENT CODE | EVENT NUMBER | SERIAL NUMBER | PROPERTY CODE | PROPERTY NAME | PROPERTY VALUE LIMIT |

FIG. 18

| 1151 | 1152 | 1153 | 1157 | 1158 | 1159 |
|---|---|---|---|---|---|
| CONTENT CODE | EVENT NUMBER | SERIAL NUMBER | TERM CODE | TERM NAME | TERM DEFINITION |

FIG. 19

| 1151 | 1152 | 1153 | 1160 | 1161 |
|---|---|---|---|---|
| CONTENT CODE | EVENT NUMBER | SERIAL NUMBER | CONTENT CODE | STRATEGY CONDITION |

FIG. 20

| 1151 | 1152 | 1153 | 1162 |
|---|---|---|---|
| CONTENT CODE | EVENT NUMBER | SERIAL NUMBER | DATA |

FIG. 34

| PROPERTY CODE (2091) | PROPERTY NAME (2092) | PROPERTY VALUE LIMIT (2093) | PROPERTY VALUE (2094) |
|---|---|---|---|
| 1001 | AGE | 0 OR POSITIVE INTEGER | 26 |
| 1002 | SEX | {MALE, FEMALE} | FEMALE |
| 1003 | ADDRESS | WITHIN 40 LETTERS | MACHIDA-SHI TOKYO |
| 1004 | TENNIS | {YES, NEITHER YES NOR NO, NO} | NEITHER YES NOR NO |
| 1005 | ALCOHOLIC DRINKS | {YES, NEITHER YES NOR NO, NO} | YES |
| 1006 | TOBACCO | {YES, NEITHER YES NOR NO, NO} | NO |
| ⋮ | ⋮ | ⋮ | ⋮ |

FIG. 35

| CONTENT CODE (2081) | STRATEGY CONDITION (2082) | STATE (2083) |
|---|---|---|
| 001 | (REGISTER CONTENT CODE) | REGISTER |
| 002 | (DELETE CONTENT CODE) | REGISTER |
| 003 | (PAUSE CONTENT CODE) | REGISTER |
| 004 | (RESUME CONTENT CODE) | REGISTER |
| 005 | (CHANGE CONTENT CODE) | REGISTER |
| ⋮ | ⋮ | ⋮ |
| 011 | (REGISTER PROPERTY ITEM) | REGISTER |
| 012 | (DELETE PROPERTY ITEM) | REGISTER |
| ⋮ | ⋮ | ⋮ |
| 021 | (REGISTER TERM) | REGISTER |
| 022 | (DELETE TERM) | REGISTER |
| ⋮ | ⋮ | ⋮ |
| 099 | (UNCONDITIONAL "BROADCAST") | REGISTER |
| ⋮ | ⋮ | ⋮ |
| 102 | AGE=TWENTIES & SEX=FEMALE & ADDRESS=TOKYO | REGISTER |
| 103 | ALCOHOLIC DRINKS=YES & SEX=FEMALE & ADDRESS= TOKYO | PAUSE |
| 104 | ADDRESS=KANTO AREA | REGISTER |
| 106 | ALCOHOLIC DRINKS=YES & SEX=FEMALE & ADDRESS= TOKYO | REGISTER |
| ⋮ | ⋮ | ⋮ |

| EVENT NUMBER (2121) | EVENT START TIME (2122) | EVENT END TIME (2123) | RECEIVABLE NUMBER (2124) | RECEIVED NUMBER (2125) |
|---|---|---|---|---|
| 001 | 96 / 12 / 03 : 00 : 00 : 00 | 96 / 12 / 03 : 00 : 01 : 00 | 1 | 0 |

| CONTENT CODE (1151) | EVENT INFO (1170) | SERIAL NUMBER (1153) | DATA (1162) |
|---|---|---|---|

| EVENT NUMBER (1171) | EVENT START TIME (1172) | EVENT END TIME (1173) | RECEIVABLE NUMBER (1174) |
|---|---|---|---|

METHOD OF SENDING AND RECEIVING INFORMATION AND SYSTEM USING SUCH METHOD

BACKGROUND OF THE INVENTION

The present invention relates to a method of transmitting information between information sending equipment and information receiving equipment.

As a fundamental method of a method of transmitting information between information sending equipment and information receiving equipment, there has hitherto been known a communication method using a content code disclosed in U.S. Pat. No. 4,366,479. In this method, the information sending equipment adds a content code indicative of data contents to the data and sends such data. On the other hand, the information receiving equipment judges based on previously-designated content codes whether or not the reception side user effects a selective reception of the data, i.e. whether or not the reception side user receives the data.

According to this method, the information sending equipment side or the system administrator or manager decides the numbers of a plurality of content codes and the meanings thereof. The information receiving equipment side learns the numbers of content codes that can be used and the meanings thereof in advance by some method, selects content codes necessary for its own receiving equipment, and sets the selected content codes in a manual fashion.

Let us consider the case in which commercial/advertisement information concerning a certain merchandise is distributed to ordinary users in the home by using a communication satellite and a network. Also, in this case, let it be assumed that a market strategy officer or commercial/advertisement information provider considers that such merchandise should be distributed to only the users of "twenties/female/TOKYO" as a market strategy. According to the content code communication method disclosed in U.S. Pat. No. 4,366,479, initially, the market strategy officer determines a content code expressing "for twenties/female/TOKYO" as "1001", for example, and sends data of such content code to the user on the information receiving side by some method. Then, if the user on the information receiving side wants to obtain the data sent in the form of the content code "1001", i.e. data suited for "twenties/female/TOKYO", then the user on the information receiving side has to set this content code "1001" in its own receiving equipment as a necessary content code in a manual fashion.

Then, when the market strategy officer considers that another merchandise should be distributed to only users suited for "twenties/female", the market strategy officer determines the content code expressing "twenties/female" as a content code "1002", for example, and sends data of such content code to the user on the information receiving side by some method. Then, if the user on the information receiving side wants to obtain data sent in the form of the content code "1002", i.e. data suited for "twenties/female", then the user on the information receiving side has to set such content code "1002" in its own receiving equipment as a necessary content code in a manual fashion.

It is frequently observed that the market strategy officer sets/changes the market strategy. In addition, it is also frequently observed that there exist two strategies having an important difference from a market strategy standpoint although the two strategies resemble like "twenties/female/TOKYO" and "twenties/female". From a standpoint of the user on the information receiving equipment, it is very cumbersome for such user to set the content code in its own receiving equipment in a manual fashion each time the strategy is set frequently and modified delicately.

Moreover, the above-mentioned content code communication method is characterized in that the user on the information receiving side is allowed to set only a necessary content code of its own will. Accordingly, there is no other way that data is selected and received by the user on the information receiving side of its own will. For example, unless the information receiving side user sets the content code "1001", there is then presented the problem that the strategy for distributing the merchandise advertisement to the users of "twenties/female/TOKYO" becomes ineffective substantially. That is, there is the problem that the market strategy officer on the information sending side cannot urge the user on the information receiving side to selectively receive the merchandise advertisement as the strategy officer has expected to be in the market strategy.

A similar problem will occur not only when the above-mentioned commercial/advertisement information is distributed but also when ordinary information is distributed. In other words, the information sender cannot combine properties of receivers in such various fashions that only a target receiver may selectively receive information.

Also, according to the content code communication method disclosed in U.S. Pat. No. 4,366,479, the receiving side user in the information receiving equipment selectively receives data based on the previously-designated content code. As a consequence, even when data are received a plurality of times during a certain constant period of time, it is unavoidable that such receiving side user receives every data.

Therefore, even when the user wants to receive data of the fixed number (e.g. a piece of data) during a certain constant period of time, this becomes impossible. When merchandise advertisement information is distributed in the 30-second commercial time zone in a television program, only one merchandise advertisement information can be received and displayed in a time period of 30 seconds in a real time fashion. If it is considered that an advertisement of a merchandise A is provided to the users of "twenties/female/TOKYO" and an advertisement of a merchandise B is provided to the users of "twenties/female" during a time period of 30 second according to the same market strategy, then it is unavoidable that the user of "twenties/female/TOKYO" receive merchandise information of both the A and B merchandises because the property "twenties/female/TOKYO" is contained in the property "twenties/female". There is then presented the problem that the information receiving equipment is unable to determine which of the advertisements of the merchandises A and B should be received or displayed.

A similar problem occurs not only in a communication method using a content code (hereinafter referred to as "content code communication method") but also in an address communication method using a protocol containing an ordinary destination address. For example, if a plurality of merchandise advertisement data (information) are distributed during the same time zone and a plurality of data are received/displayed in a real time fashion by designating a user C as a destination address, then the user C can read and understand only merchandise advertisement information of a finite number (maybe one or two) at the same time due to a limit of man's understanding ability.

SUMMARY OF THE INVENTION

It is an object of the present invention to provide a content code communication method which can alleviate a load imposed upon a user on an information receiving equipment side when the user registers a necessary content code in its own information receiving equipment after the user has learned a content code that is applicable to the user.

It is another object of the present invention to provide a content code communication method in which only a target receiver is made able to selectively receive information by variously combining properties of the receiver of its own will. To be concrete, not only based on the will of the user on the information receiving equipment but also the will or the strategy of an information provider on an information sending equipment side, the target user on the information receiving equipment side is made able to selectively receive information.

Further, it is another object of the present invention to provide an ordinary communication method in which an information receiving side becomes able to receive only data of a fixed number during a certain fixed period of time.

It is a specific object of the present invention to provide an information sending and receiving method and an information sending and receiving system using such information sending and receiving method in which a user on an information receiving equipment side can selectively receive information in accordance with a will or a strategy of an information provider on an information sending equipment side.

It is a more specific object of the present invention to provide an information sending and receiving method and an information sending and receiving method using such information sending and receiving method in which only a target user is made able to selectively receive information when an information provider on an information sending equipment side combines variously properties of a user on an information receiving equipment side in accordance with a will of the information provider.

It is a further object of the present invention to provide an information sending method for use with the above-mentioned information sending and receiving system and an information sending equipment using such information sending method.

It is yet a further object of the present invention to provide an information receiving method for use with the above-mentioned information sending and receiving system and an information receiving equipment using such information receiving method.

It is still a further object of the present invention to provide a message format for use with the above-mentioned information sending and receiving system.

To attain the above-mentioned objects, according to the present invention, there is provided a system in which a plurality of information receiving equipment and a plurality of information sending equipment send and receive information through a transmission medium. The information sending equipment sends a content code indicative of data content and a condition under which the content code is registered as a registration message. The information receiving equipment receives the registration message and determines based on the received condition and a previously-set property whether or not the content code is registered. The information sending equipment adds the content code indicative of a data content to data and sends resultant data as a data message. When the data message is arrived, the information receiving equipment determines based on the received content code and the above-mentioned registered content code whether or not it receives the data. In particular, a profile of a user on the information receiving equipment, a user taste, information concerning user situation or the registered content code are used as properties.

Furthermore, in the system in which a plurality of information receiving equipment and a plurality of information sending equipment send and receive information through the transmission medium, the information sending equipment adds an event number indicative of an event with other data during a constant period of time and transmits resultant data to the information receiving equipment as a data message. When the data message is arrived, the information receiving equipment determines based on the received event number and an event number of other received message whether or not it receives data.

According to the present invention, in the information sending and receiving system using the content code communication method, when the user on the information receiving equipment side learns a content code that can be used, it is possible to alleviate a load imposed upon such user to register a necessary content code on its own information receiving equipment.

Further, according to the present invention, in the information sending and receiving system using the content code communication method, the user on the information receiving side can selectively receive information based on not only the will of the user on the information receiving equipment side but also the will of the information provider on the information sending equipment side.

Furthermore, according to the present invention, in the ordinary data communication method, when the user on the information receiving equipment side wants to receive only data of a fixed number during a certain period of time, the user can receive data of only a fixed number during a certain period of time.

Figure 7:
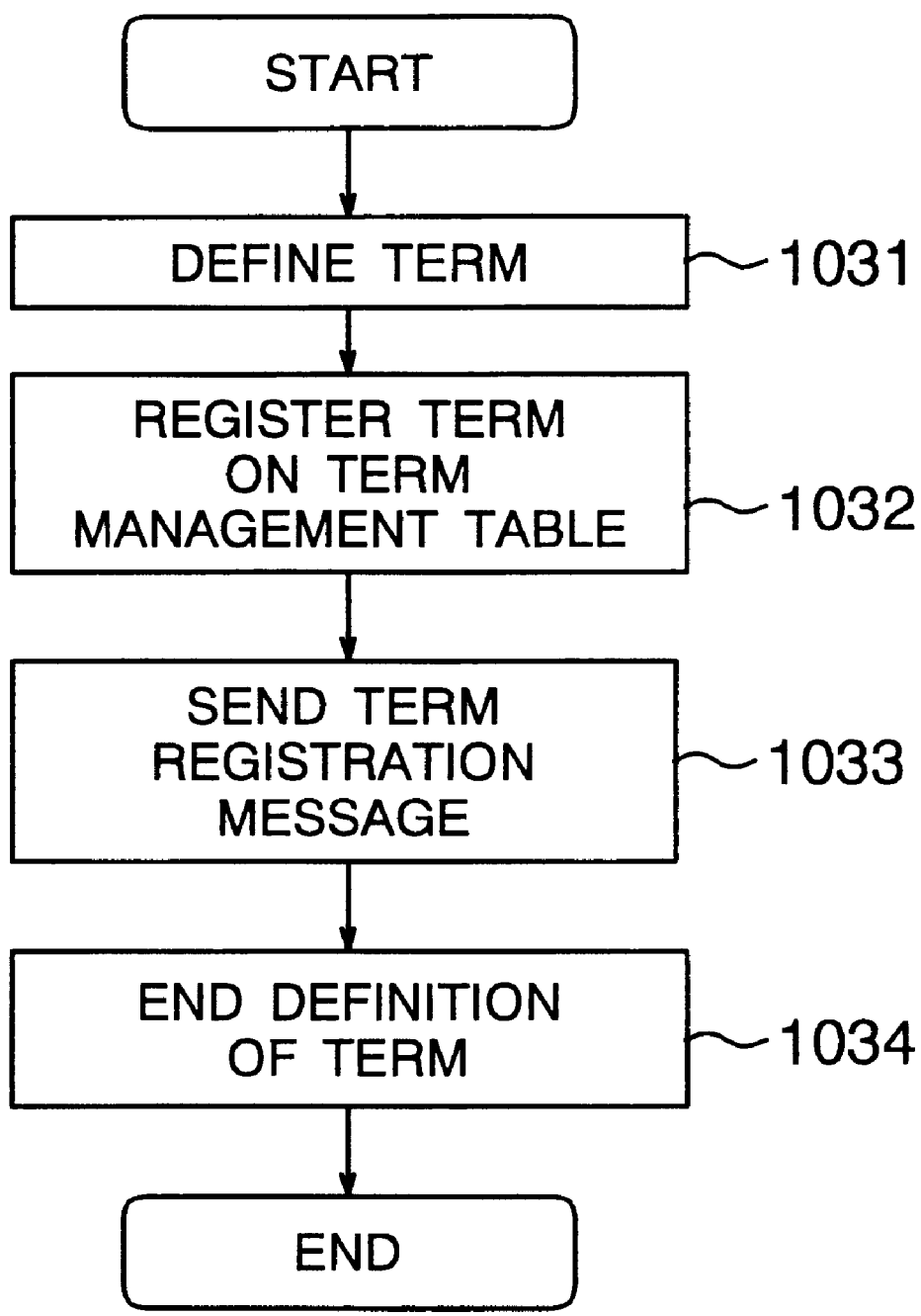
Figure 8:
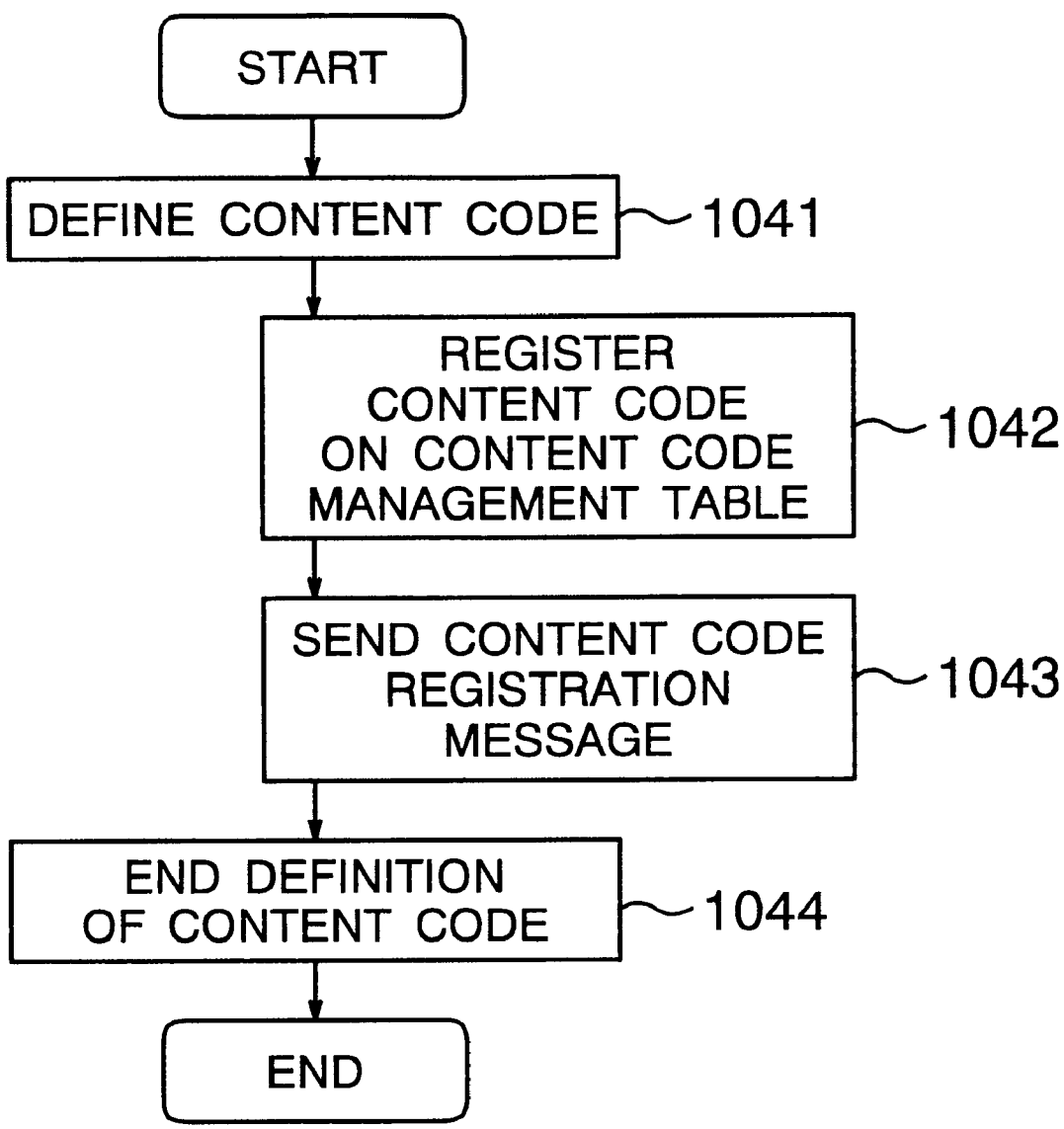
Figure 9:
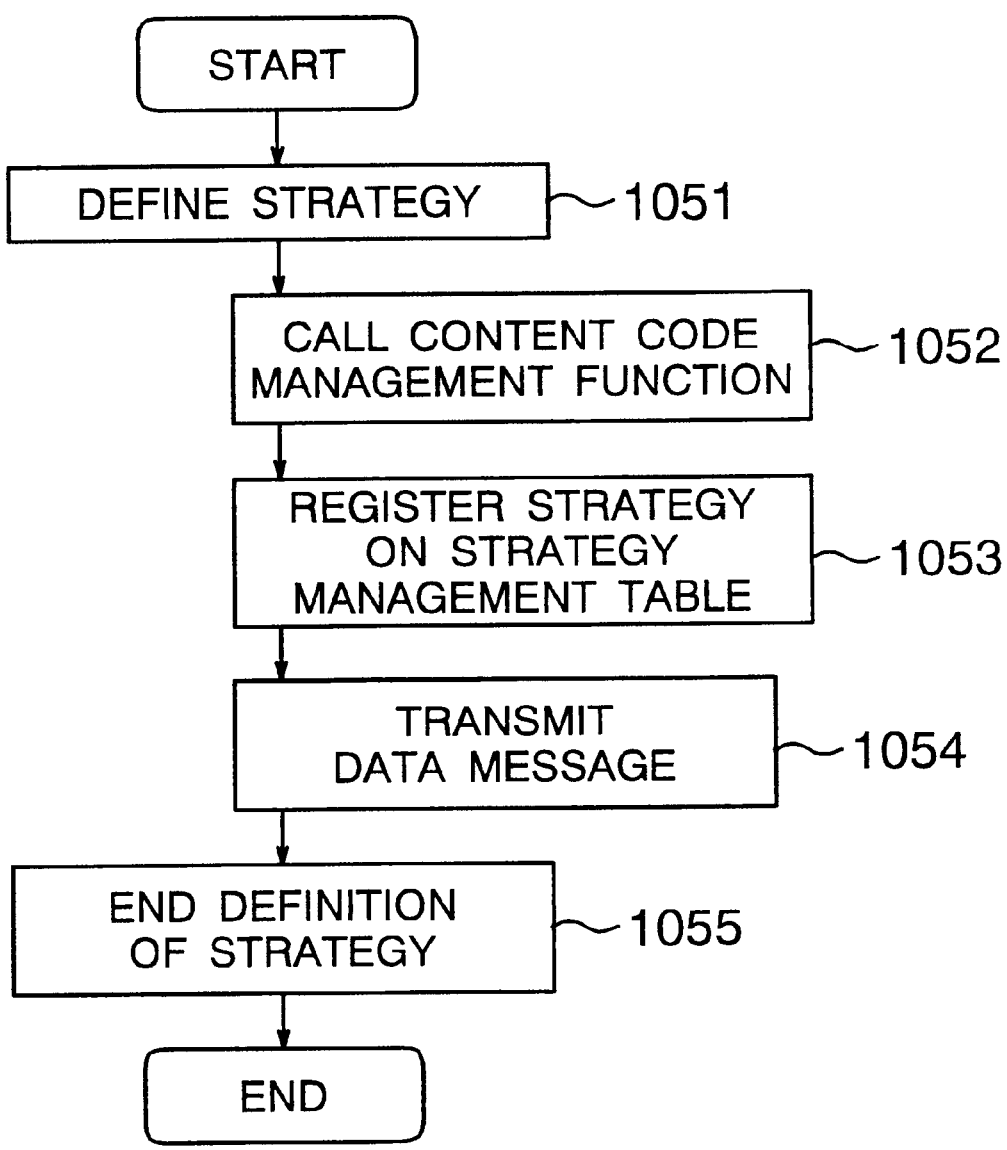
Figures 10, 11:
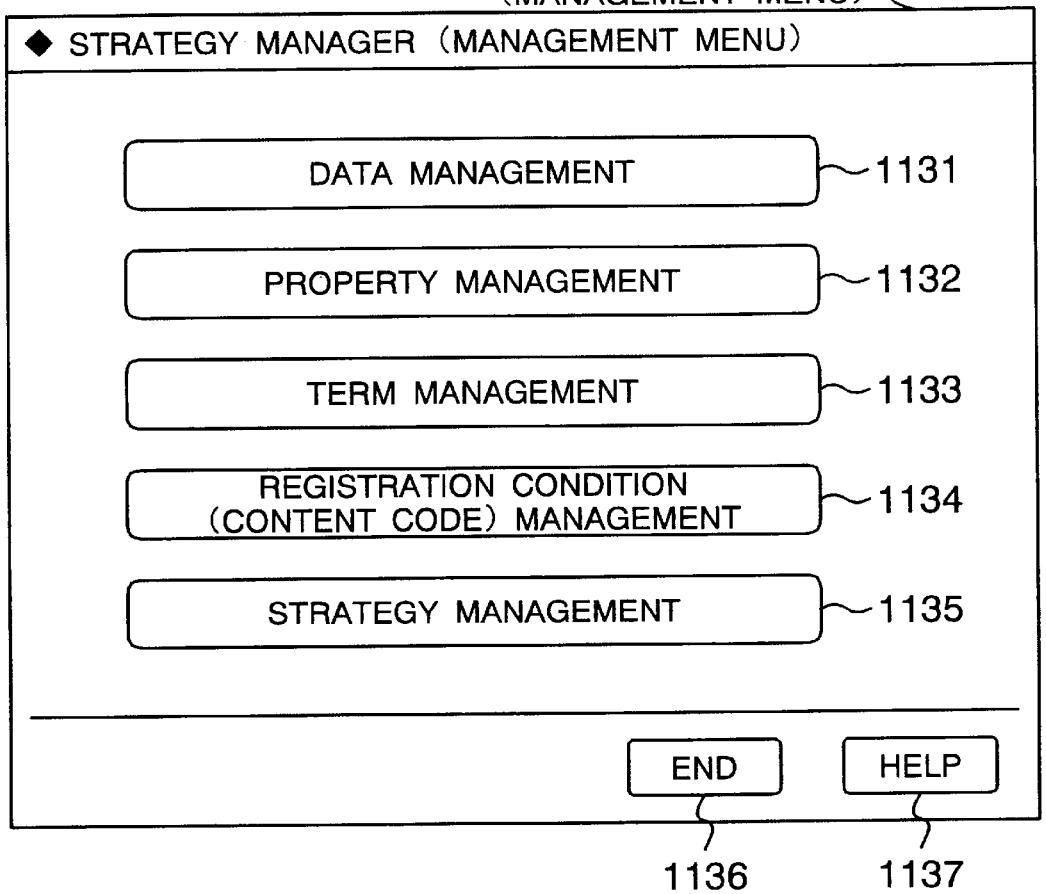
Figure 21:
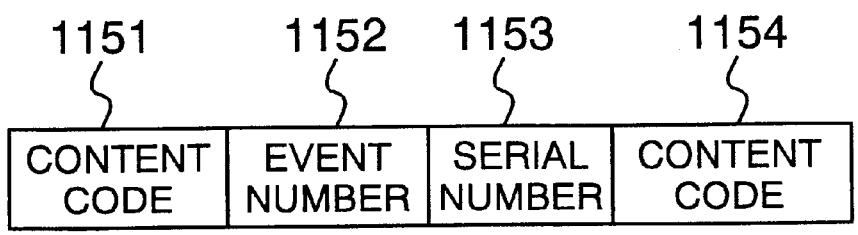
Figure 22:
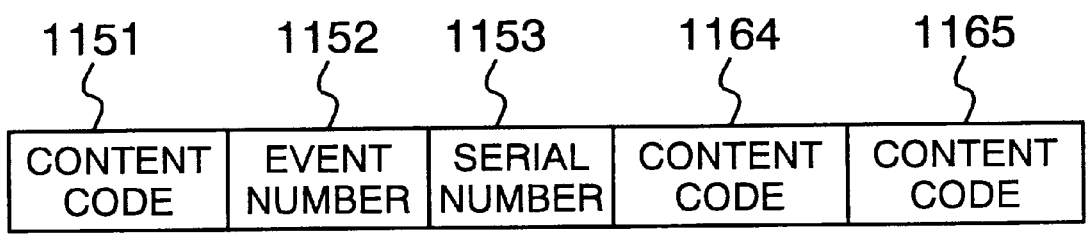
Figure 23:
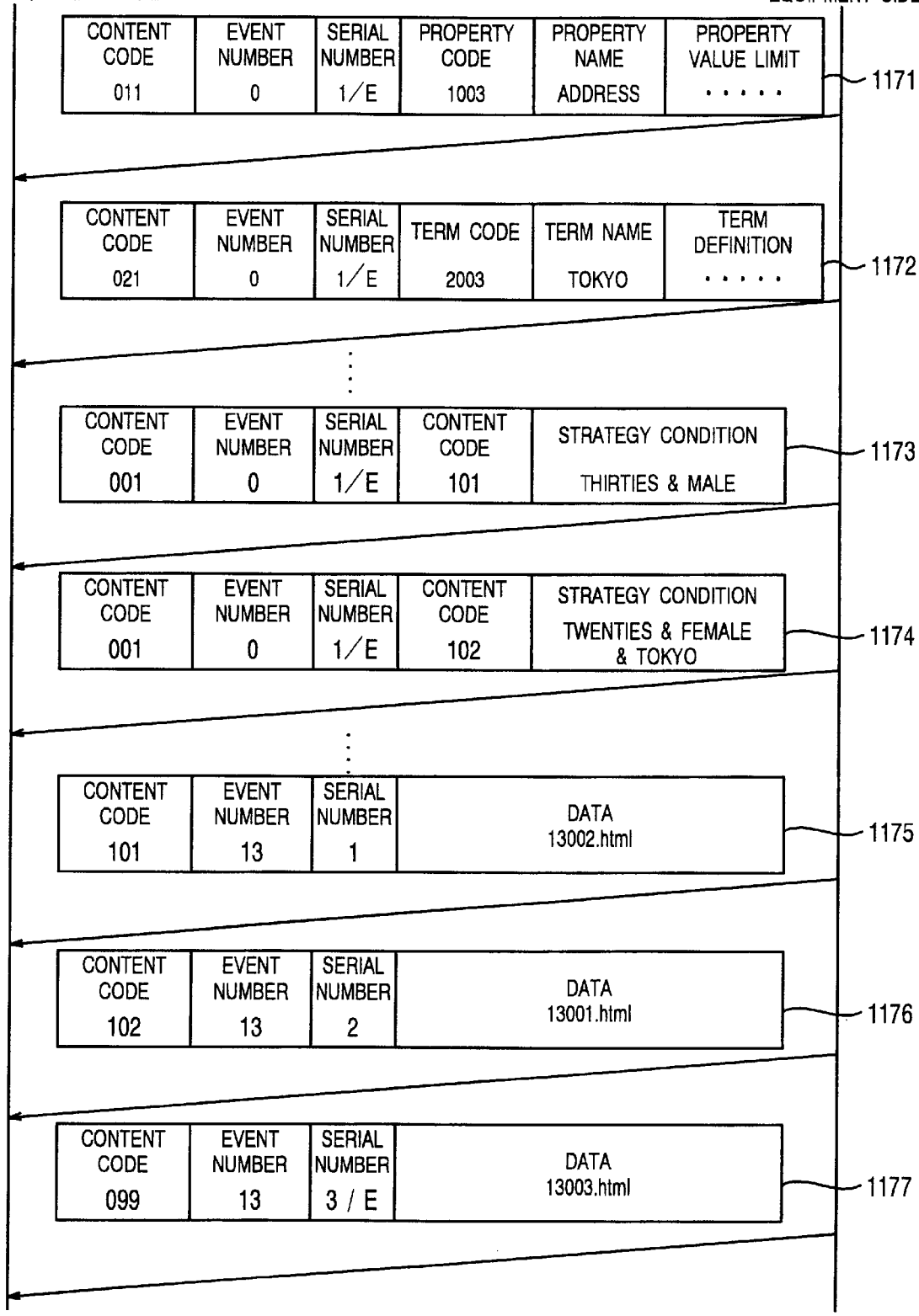
Figure 24:
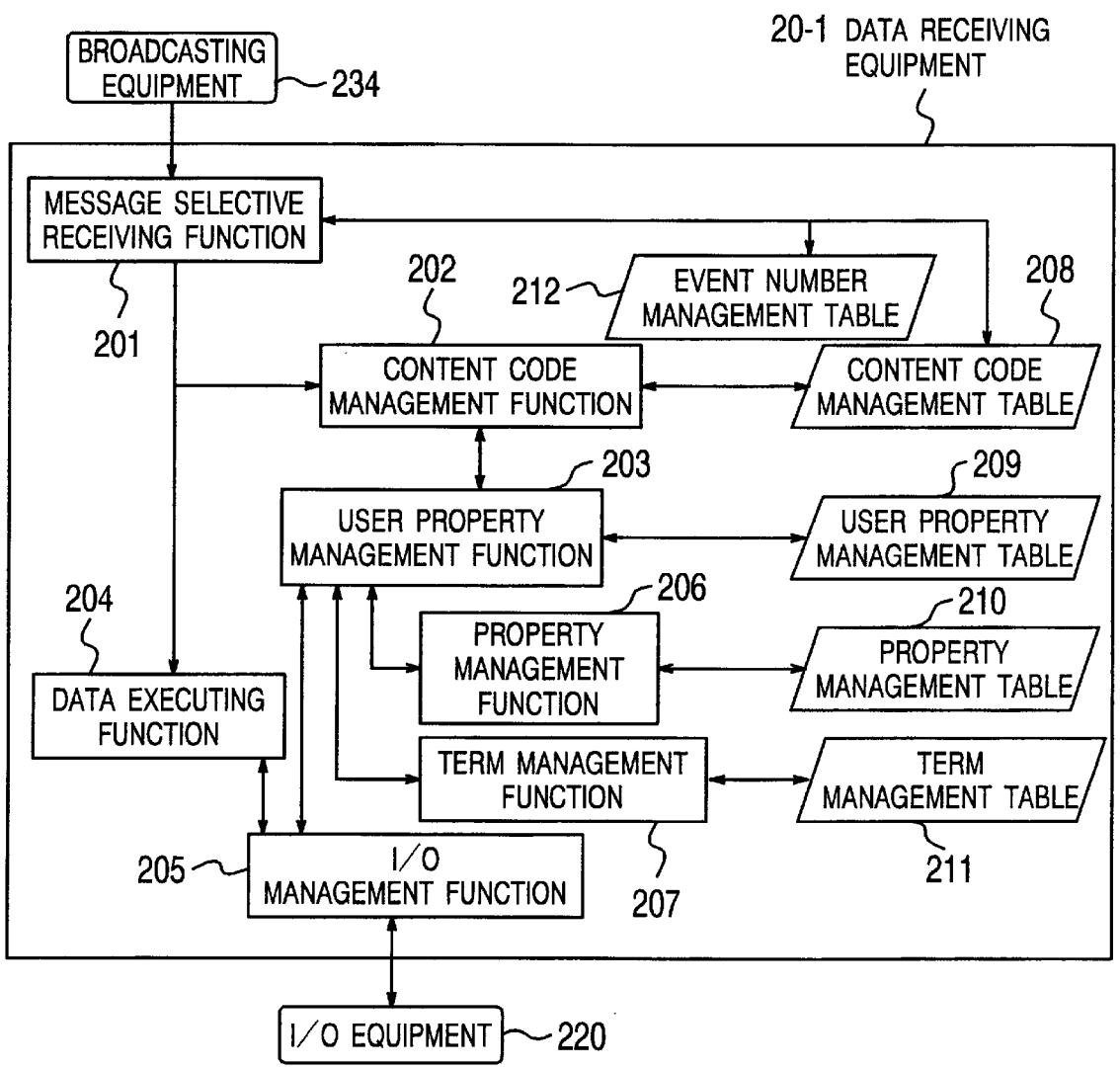
Figure 25:
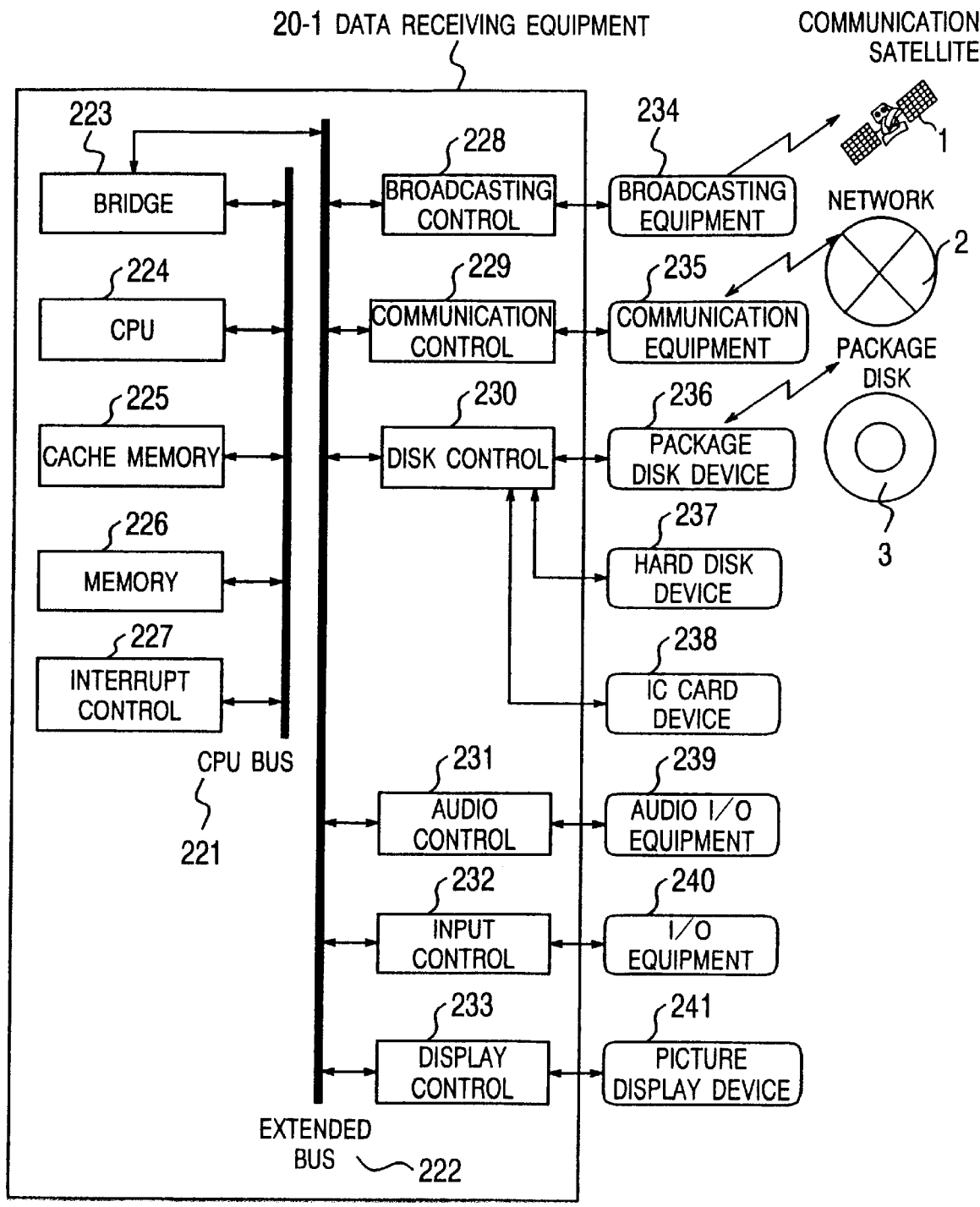
Figure 26:
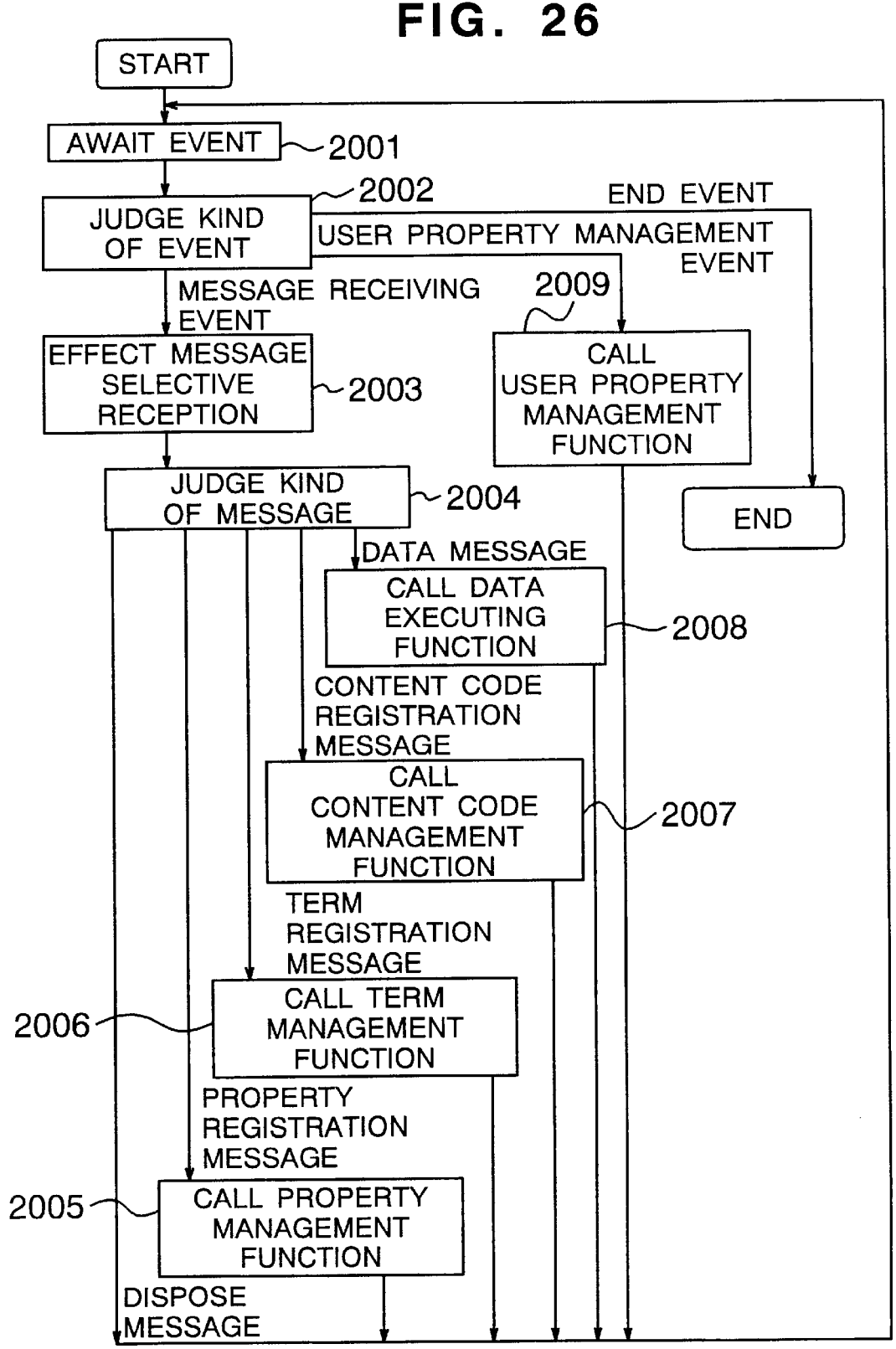
Figure 27:
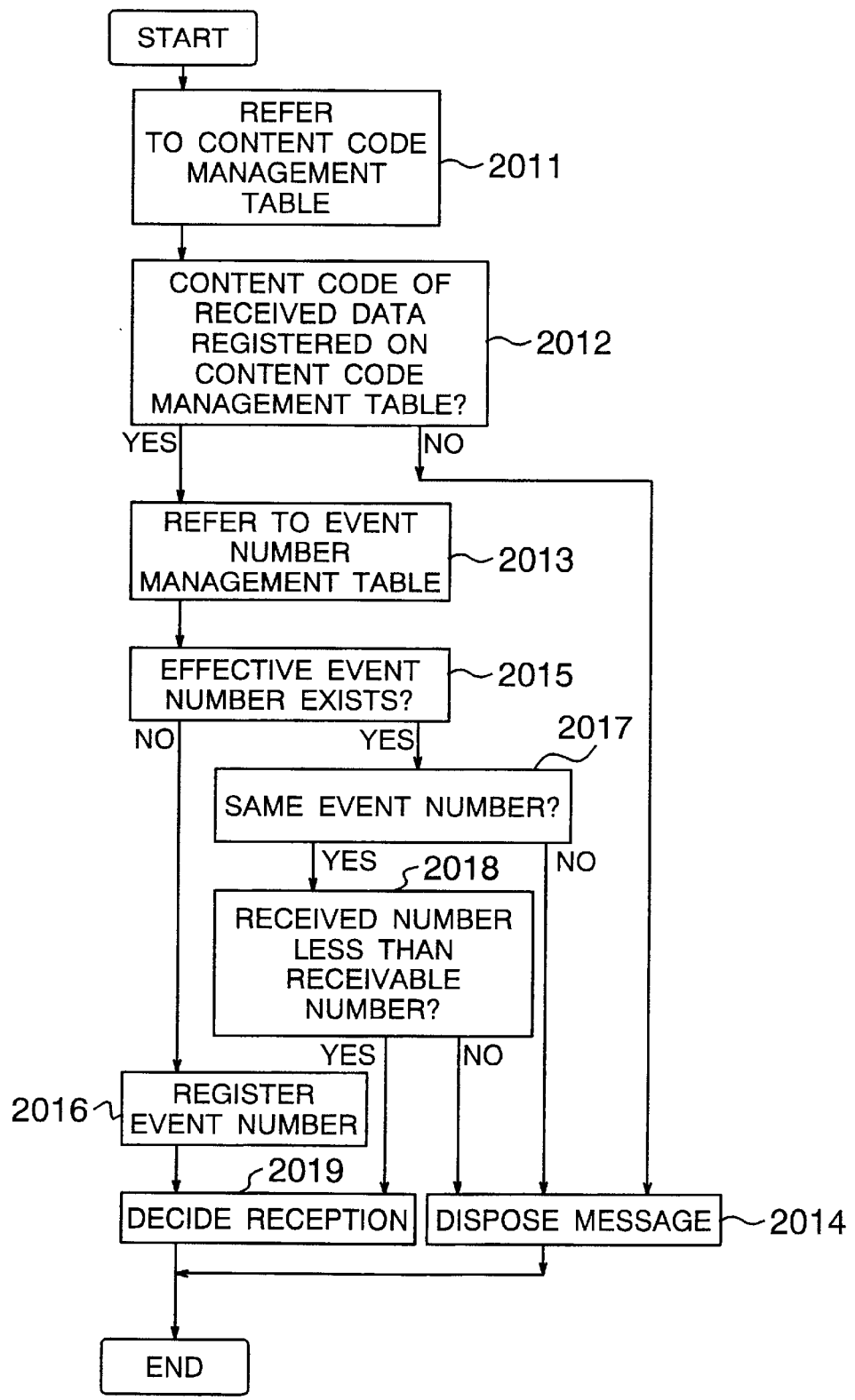
Figure 28:
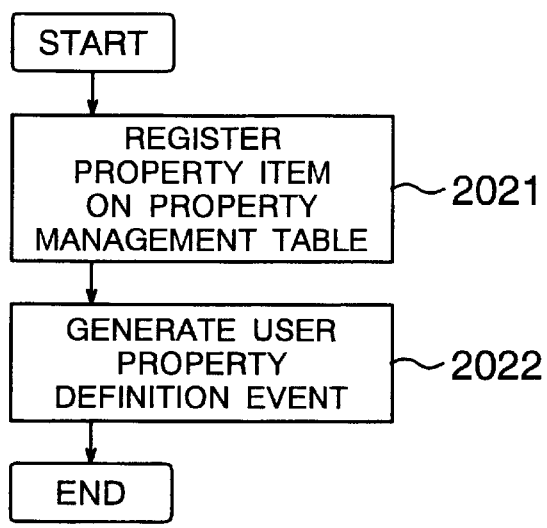
Figure 29:
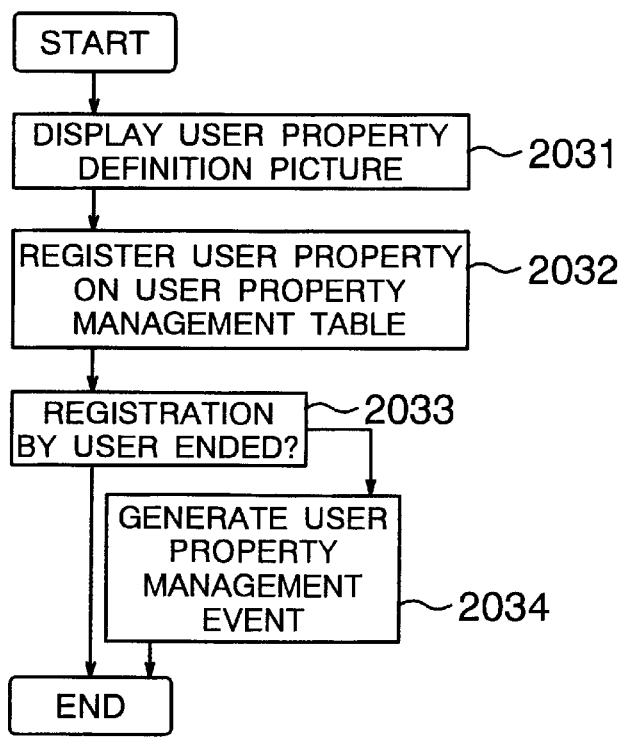

FIG, 6 is a flowchart showing an example of a main processing in a property management function in the data sending equipment;

FIG. 7 is a flowchart showing an example of a main processing in a term management function in the data sending equipment;

FIG. 8 is a flowchart showing an example of a main processing in a content code management function in the data sending equipment;

FIG. 9 is a flowchart showing an example of a main processing in a strategy management function in the data sending equipment;

FIG. 10 is a diagram showing an example of a management menu picture of the data sending equipment;

FIG. 11 is a diagram showing an example of a data file of the data sending equipment;

FIG. 12 is a diagram showing an example of a property management table of the data sending equipment;

FIG. 13 is a diagram showing an example of a term management table of the data sending equipment;

FIG. 14 is a diagram showing an example of a strategy define picture in the strategy management function in the data sending equipment;

FIG. 15 is a diagram showing an example of a strategy management table of the data sending equipment;

FIG. 16 is a diagram showing an example of a content code management table of the data sending equipment;

FIG. 17 is a diagram showing an example of a message format of a property registration message;

FIG. 18 is a diagram showing an example of a message format of a term registration message;

FIG. 19 is a diagram showing an example of a message format of a content code registration message;

FIG. 20 is a diagram showing an example of a message format of a data message;

FIG. 21 is a diagram showing an example of a message format of a content code delete/pause message;

FIG. 22 is a diagram showing an example of a message format of a content code change message;

FIG. 23 is a diagram showing an example of a message sequence from the data sending equipment to data receiving equipment;

FIG. 24 is a functional block diagram showing examples of functions of the data receiving equipment;

FIG. 25 is a block diagram showing an example of a hardware of the data receiving equipment;

FIG. 26 is a flowchart showing an example of a main processing in the data receiving equipment;

FIG. 27 is a flowchart showing an example of a main processing in a message selective receiving function of the data receiving equipment;

FIG. 28 is a flowchart showing an example of a main processing in a property management function of the data receiving equipment;

FIG. 29 is a flowchart showing an example of a main processing in a user property management function of the data receiving equipment.

Figure 30:
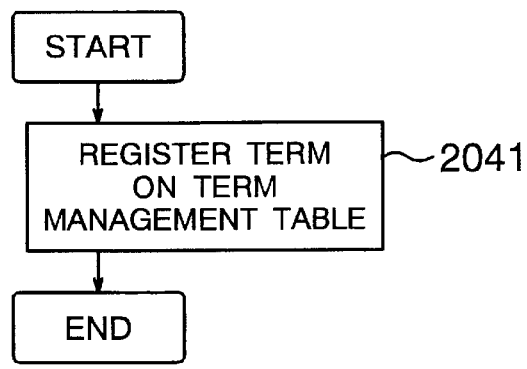
Figure 31:
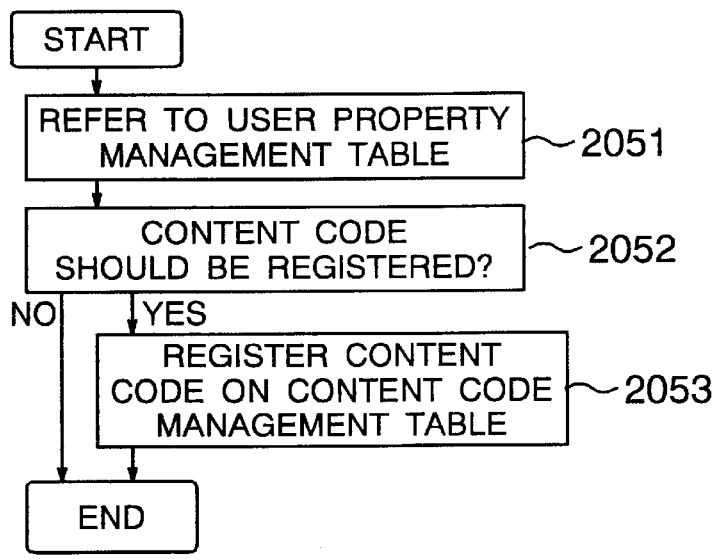
Figure 32:
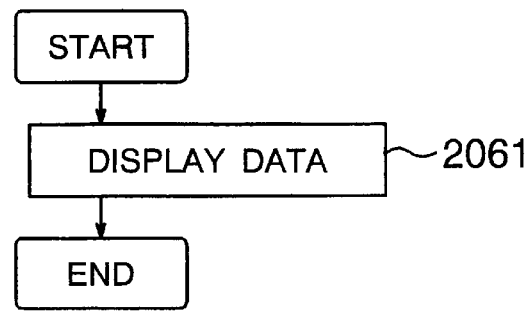
Figure 33:
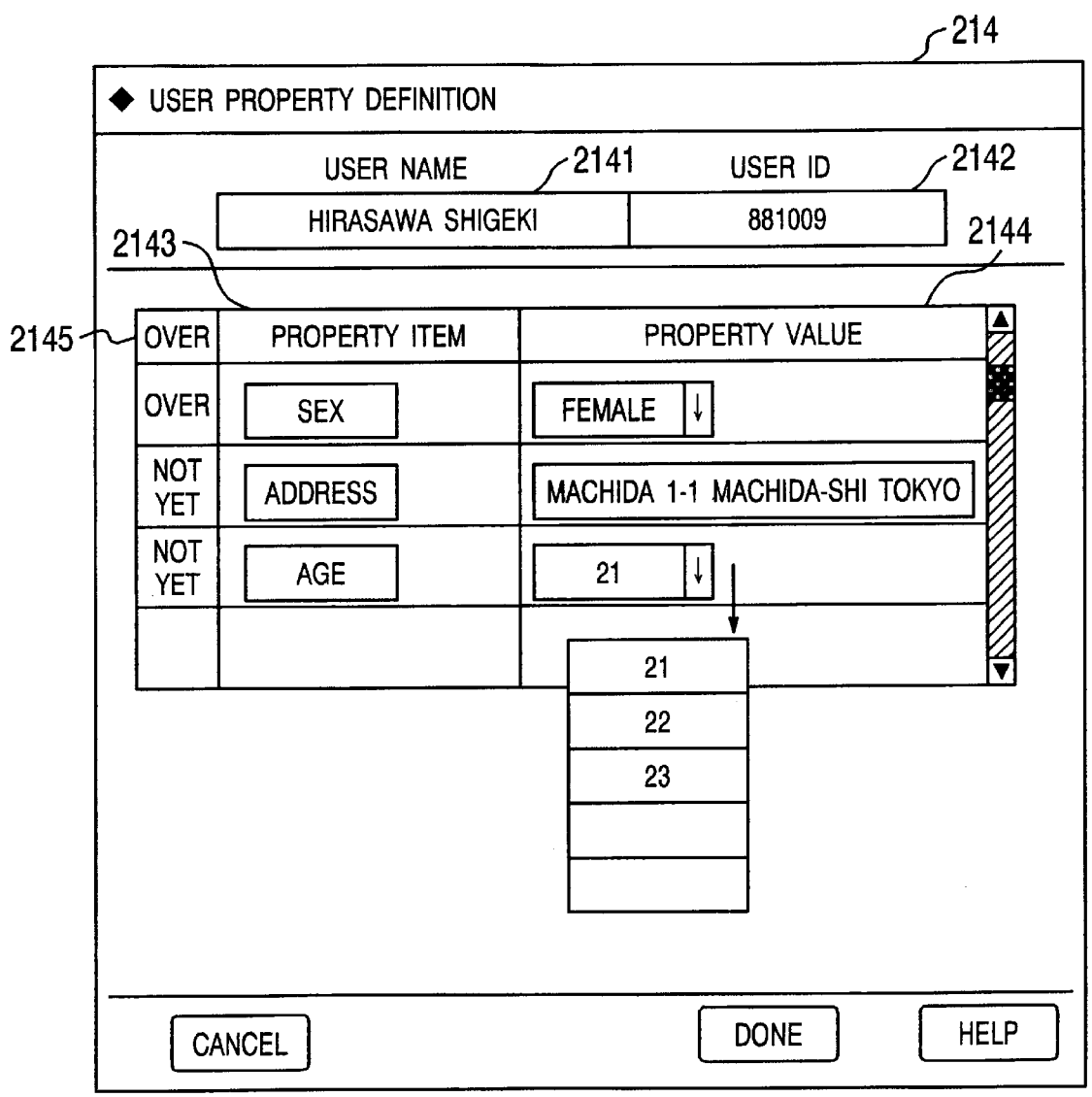
Figure 38:
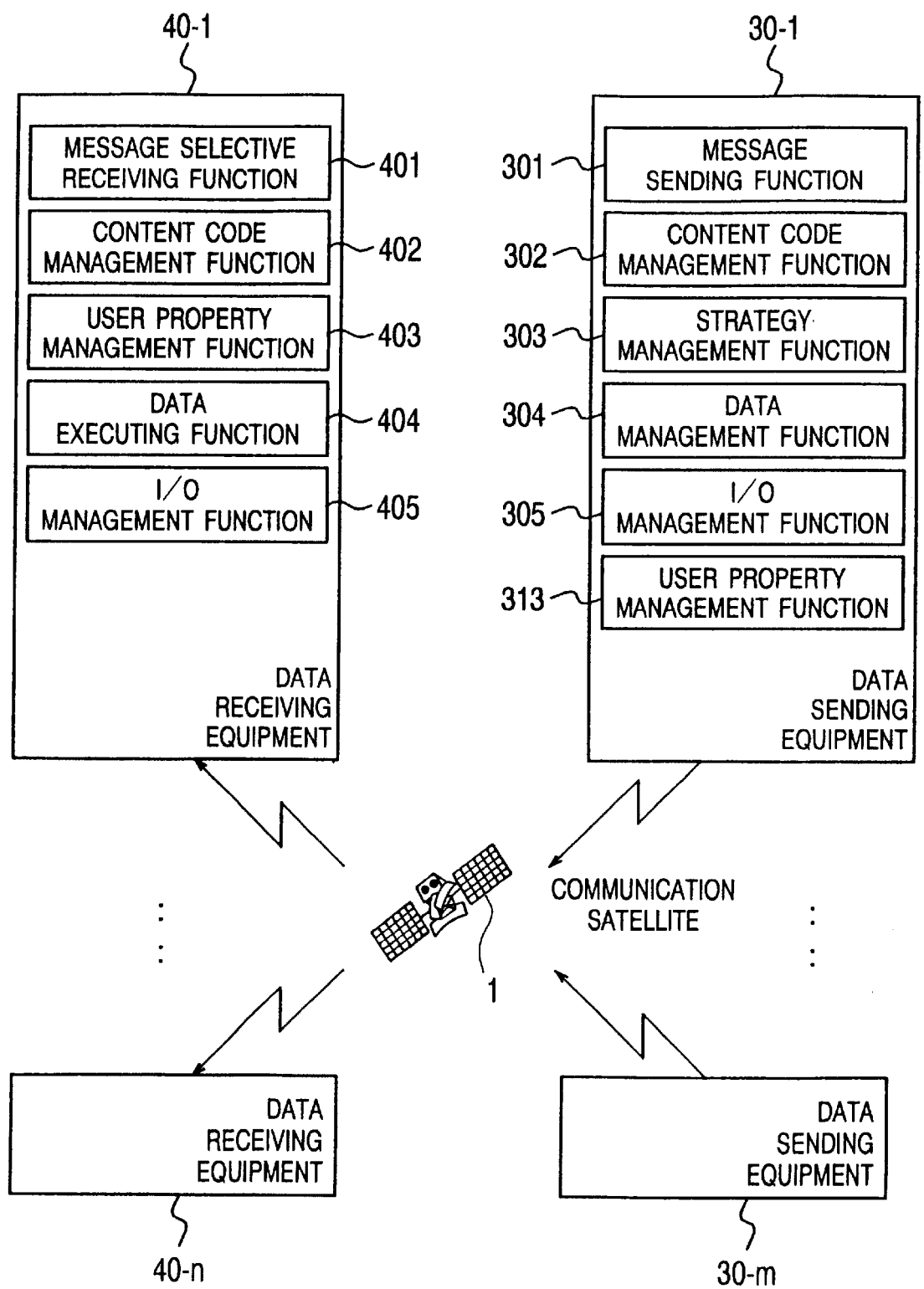
Figure 39:
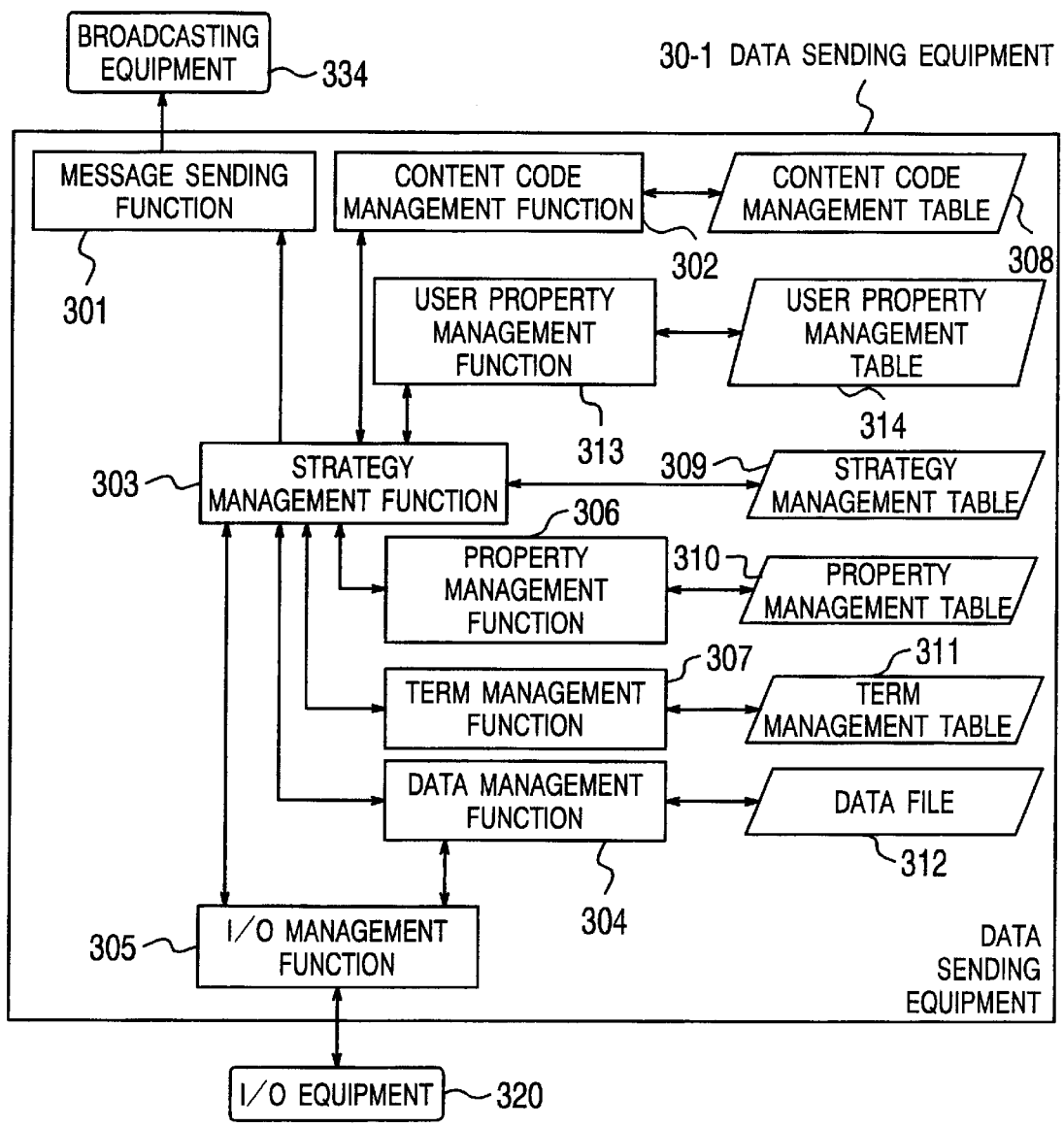
Figure 40:
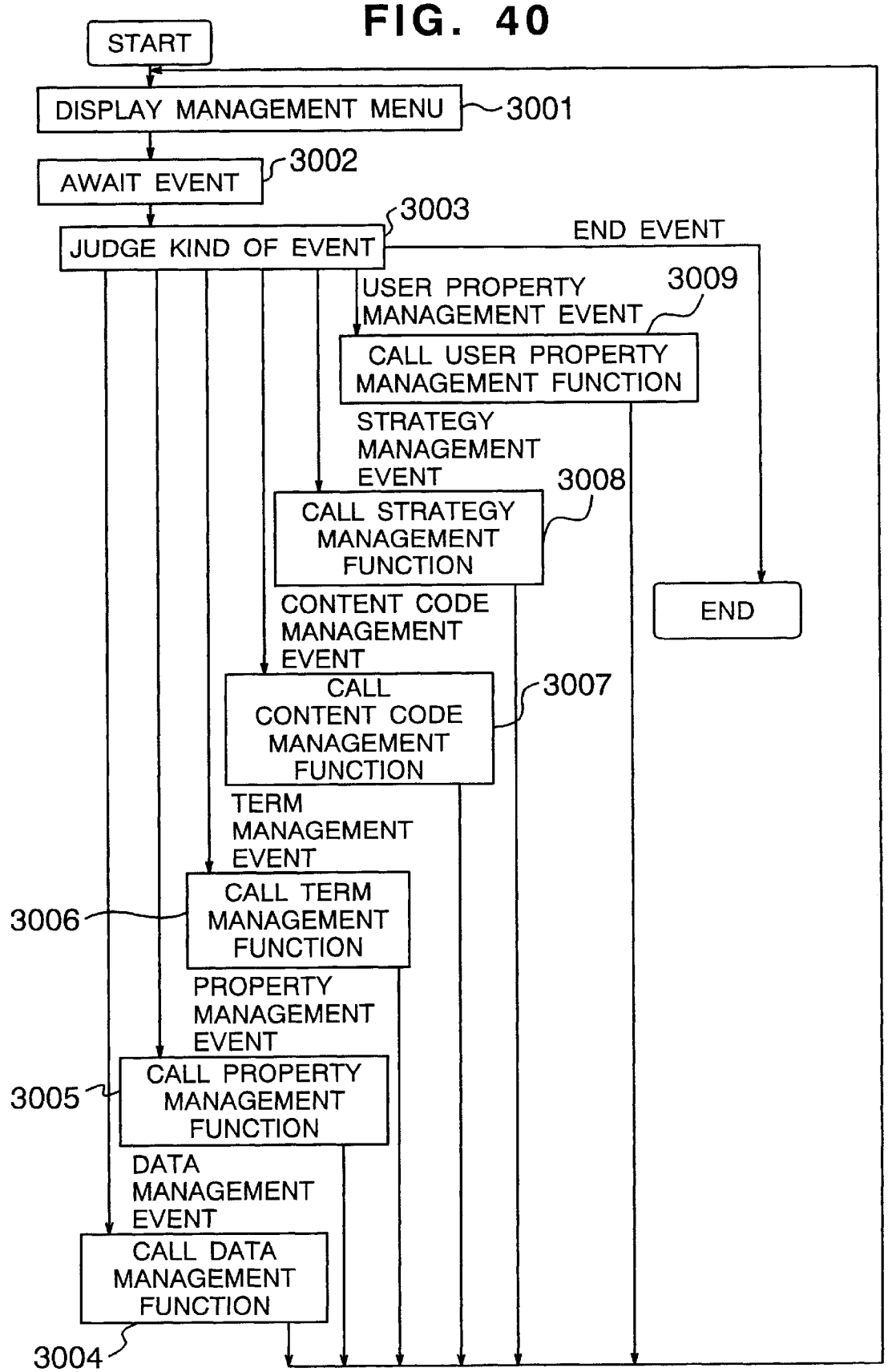
Figure 41:
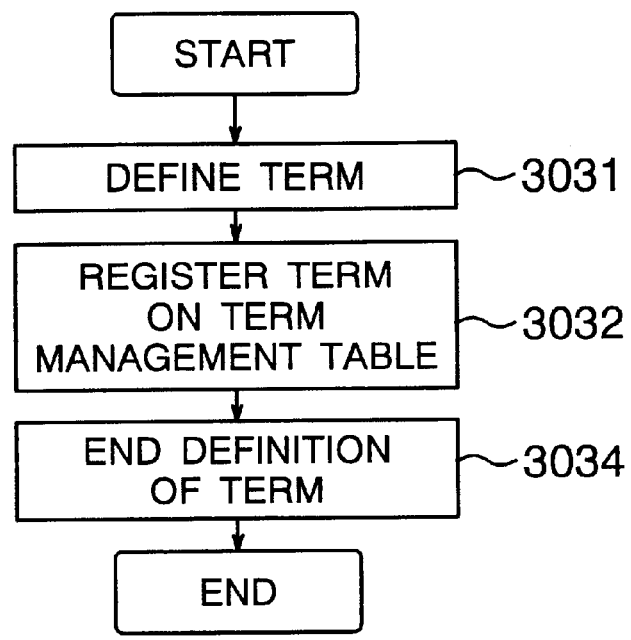
Figure 42:
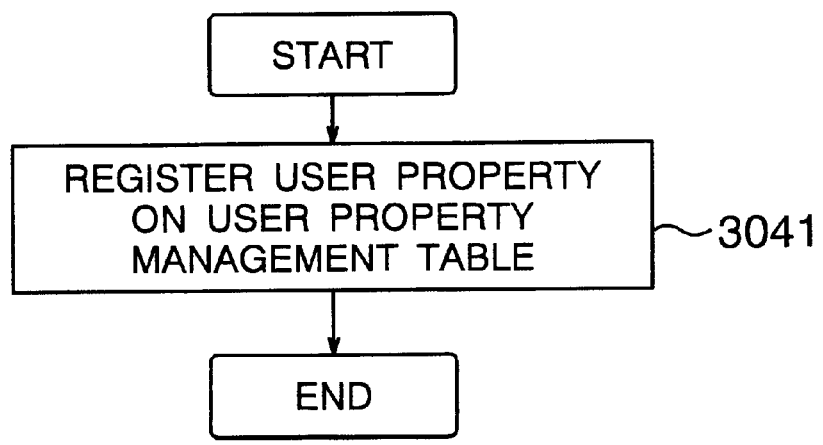
Figure 43:
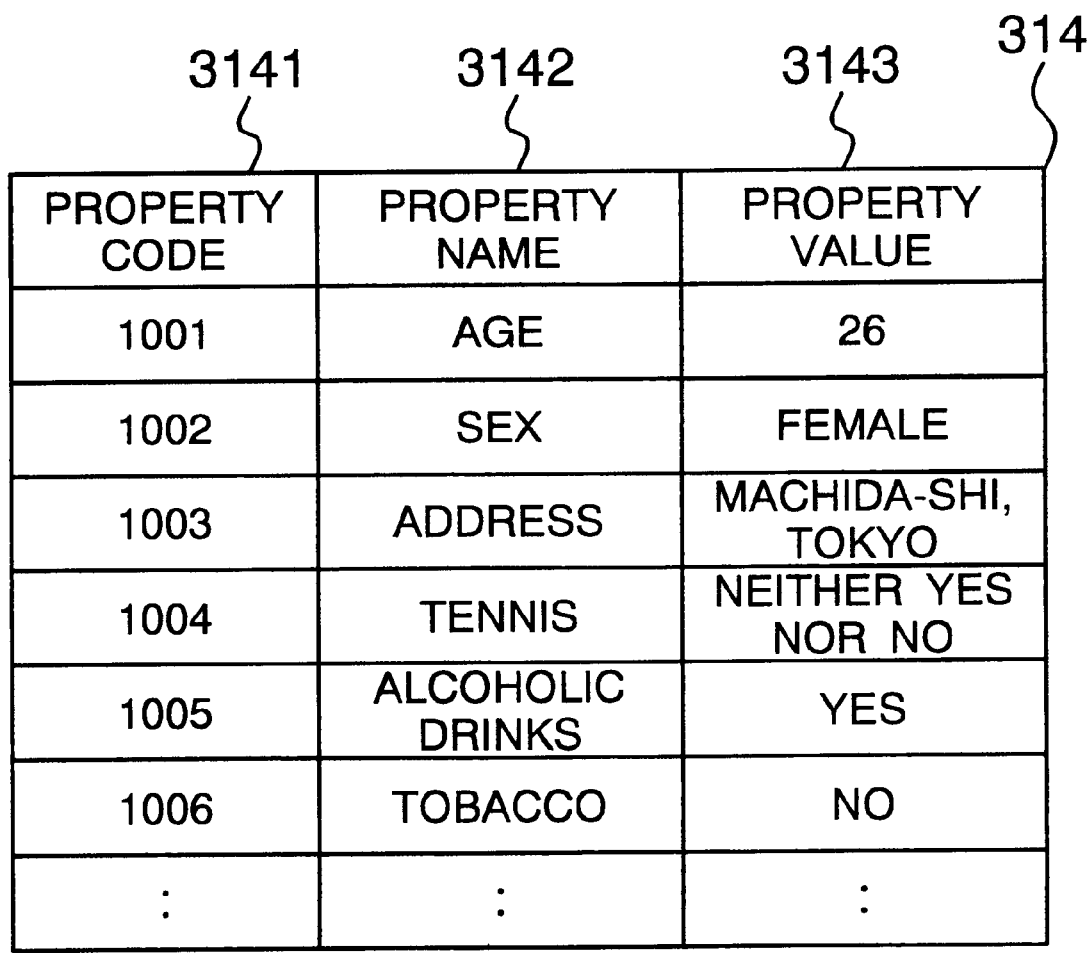
Figure 44:
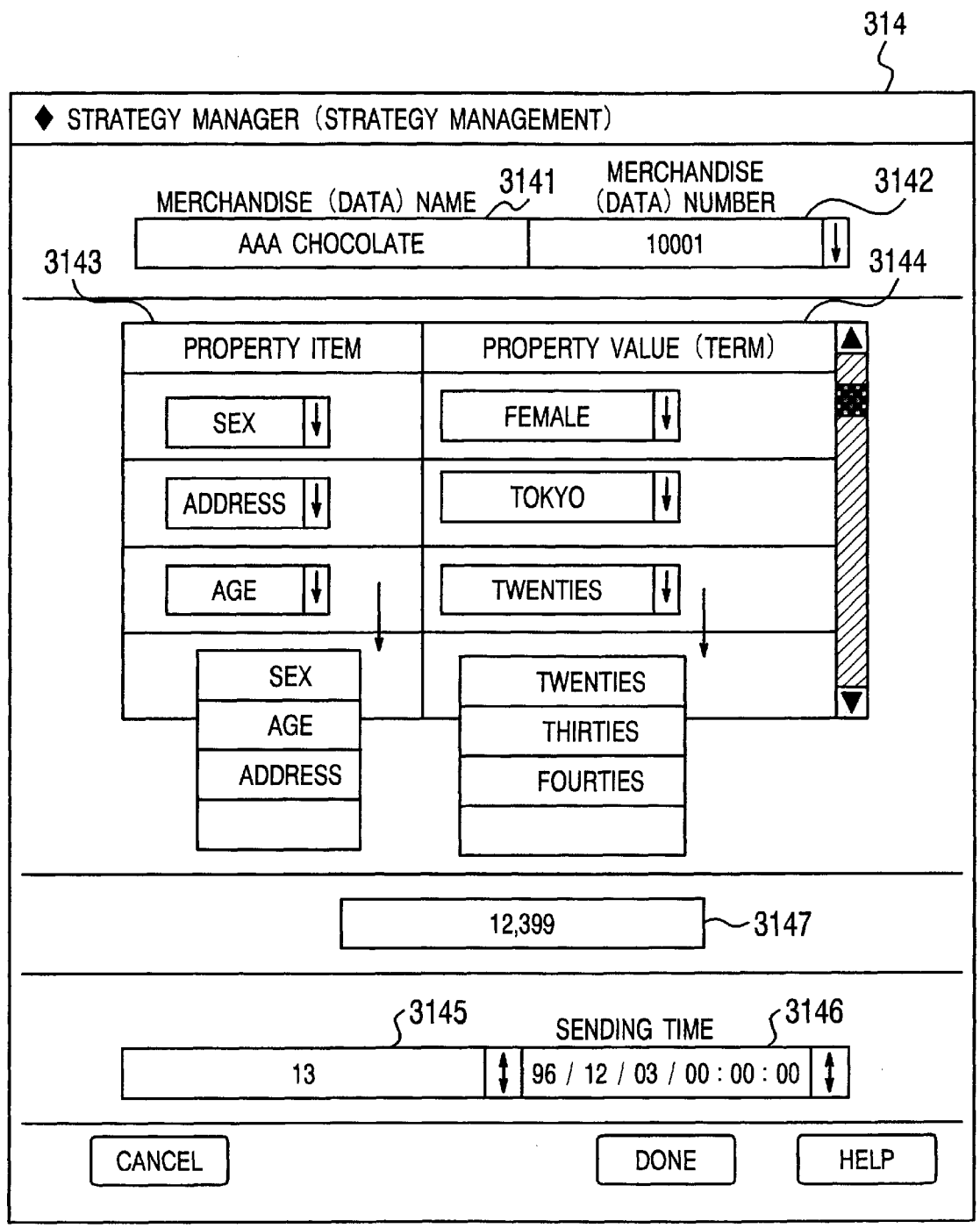
Figure 45:
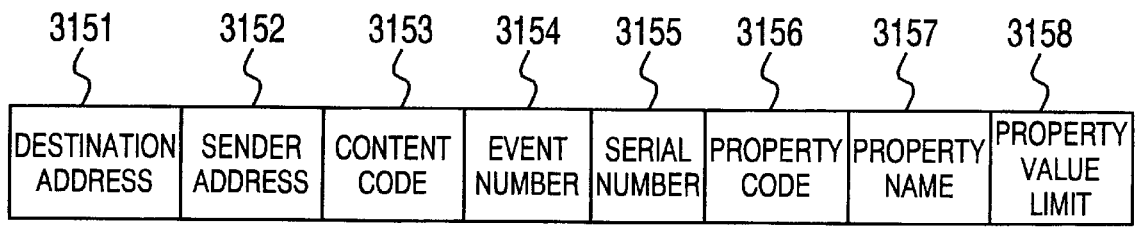
Figure 46:
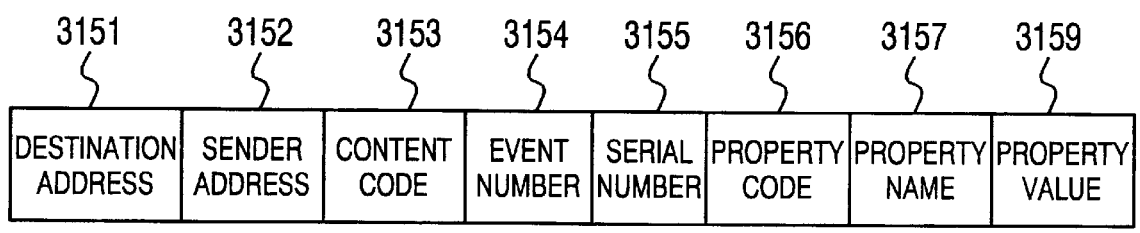
Figure 47:
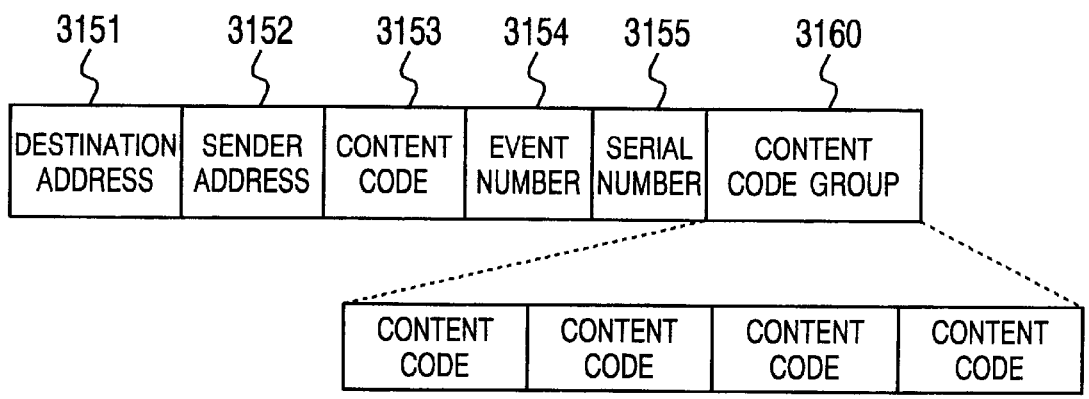
Figure 48:
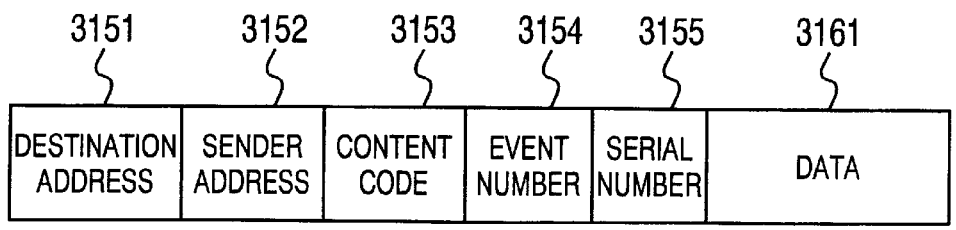
Figure 49:
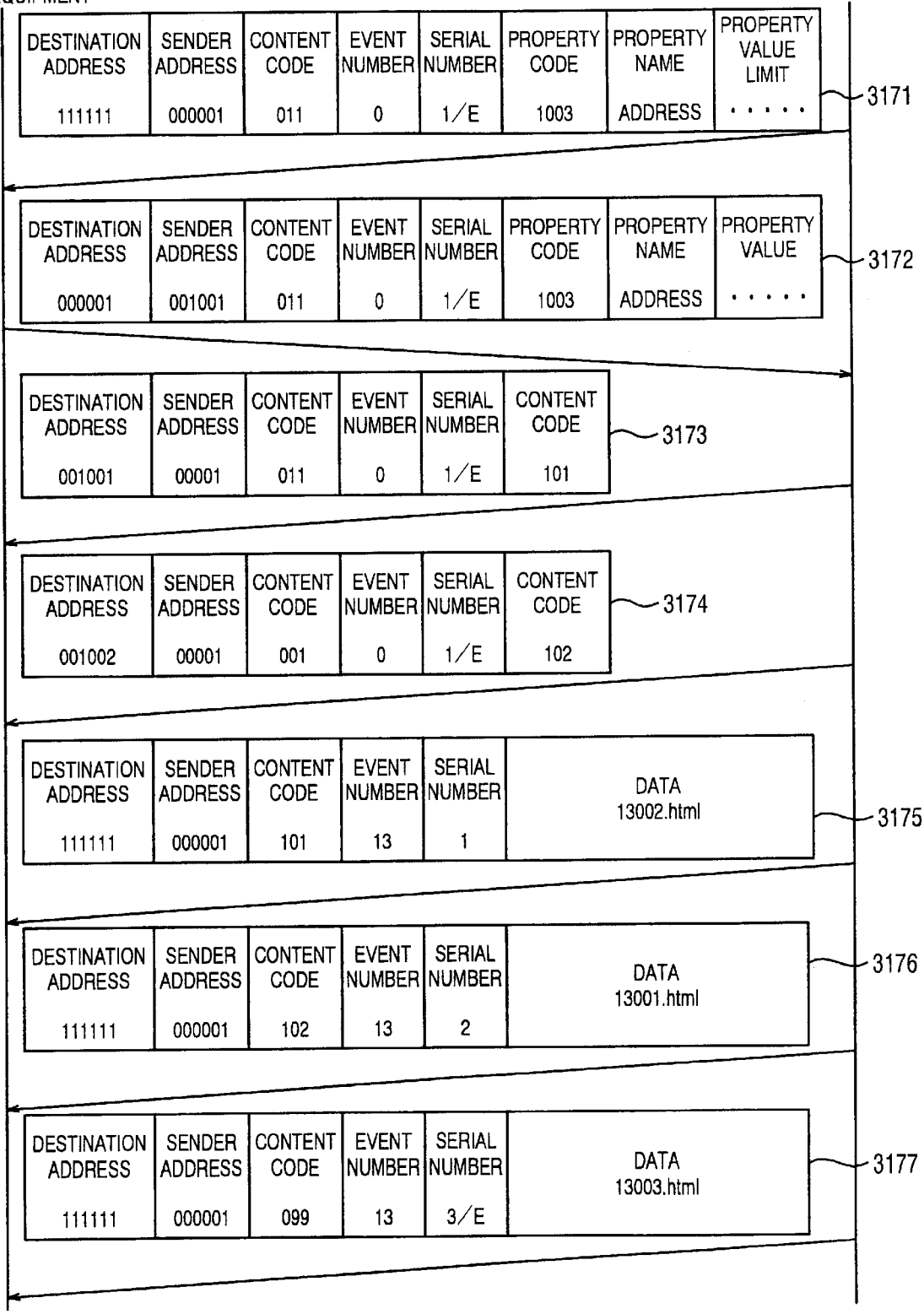
Figure 50:
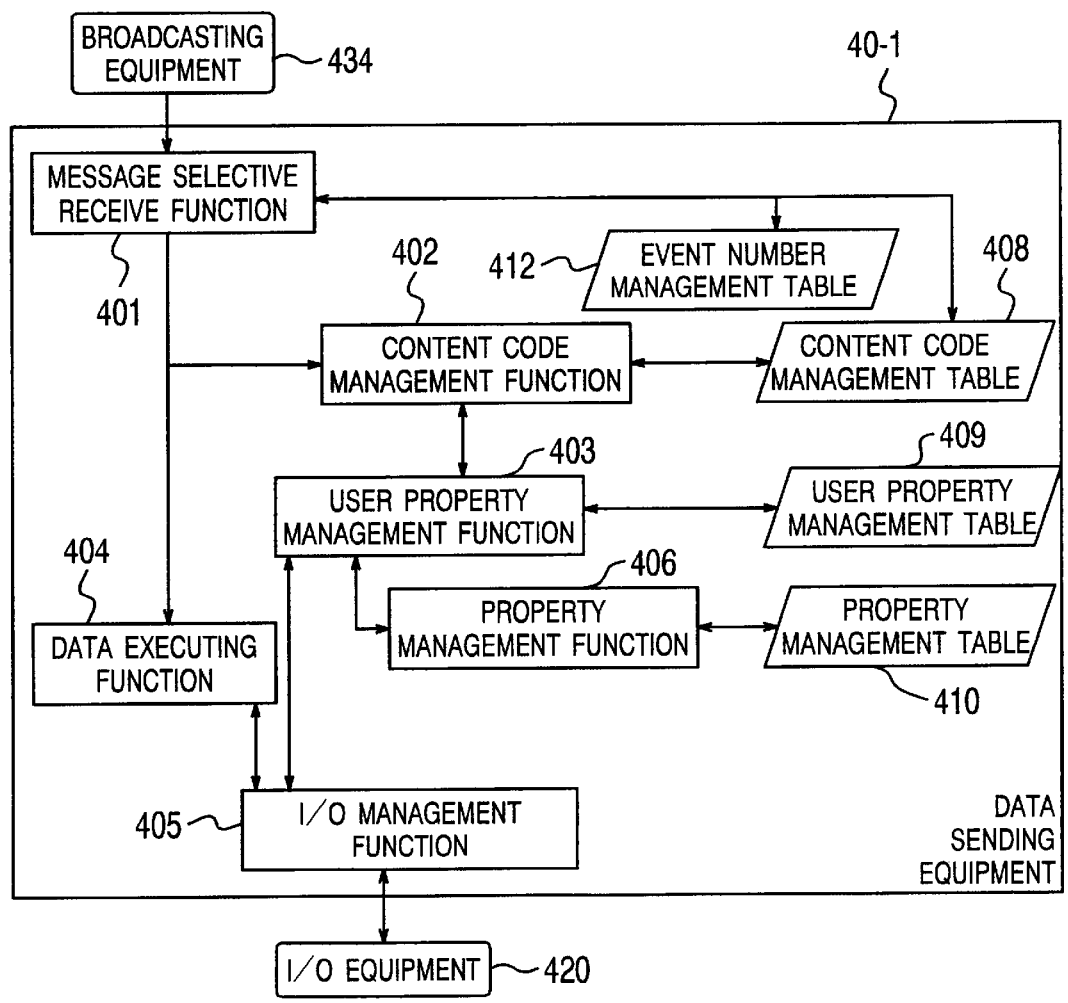
Figure 51:
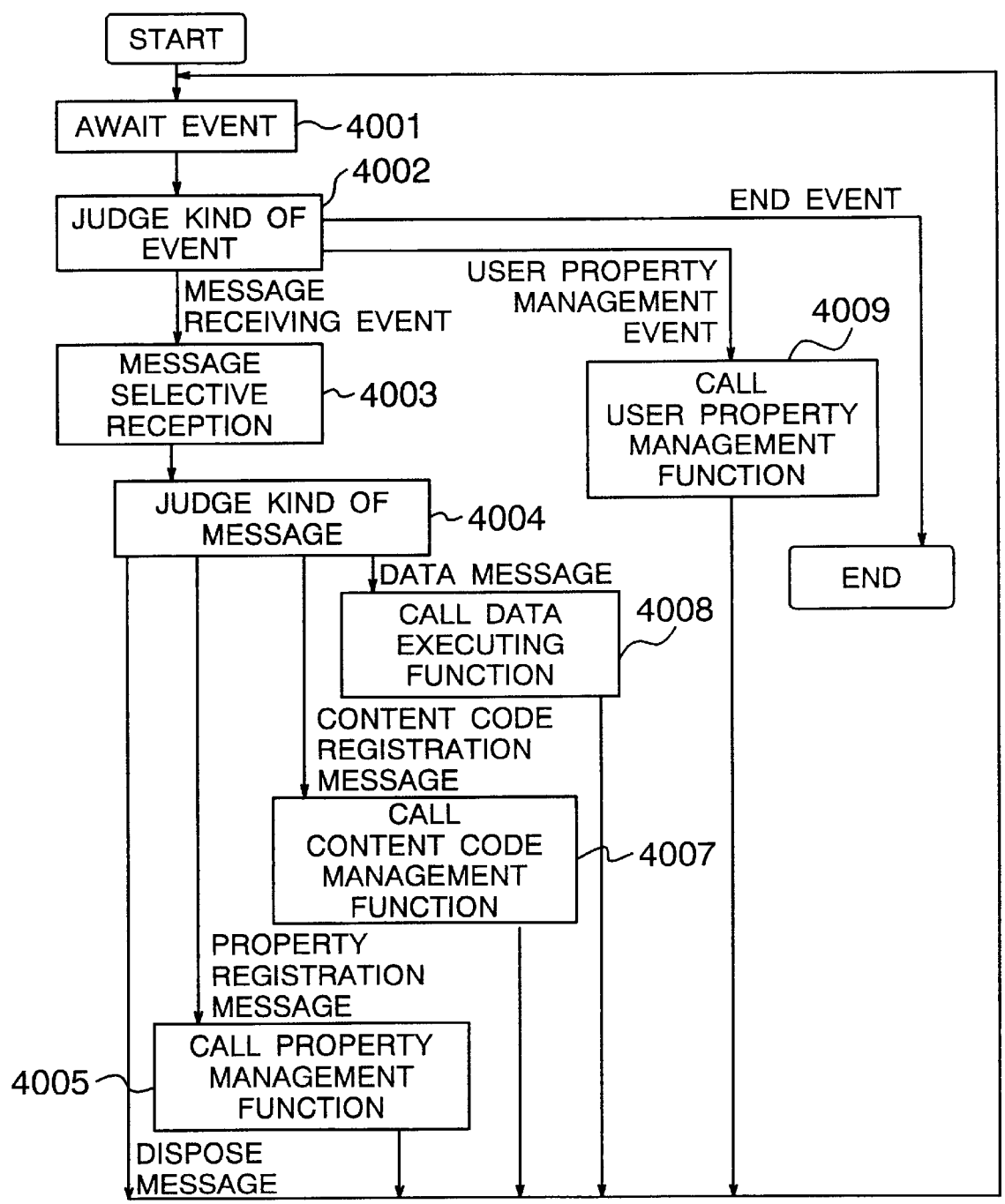
Figure 52:
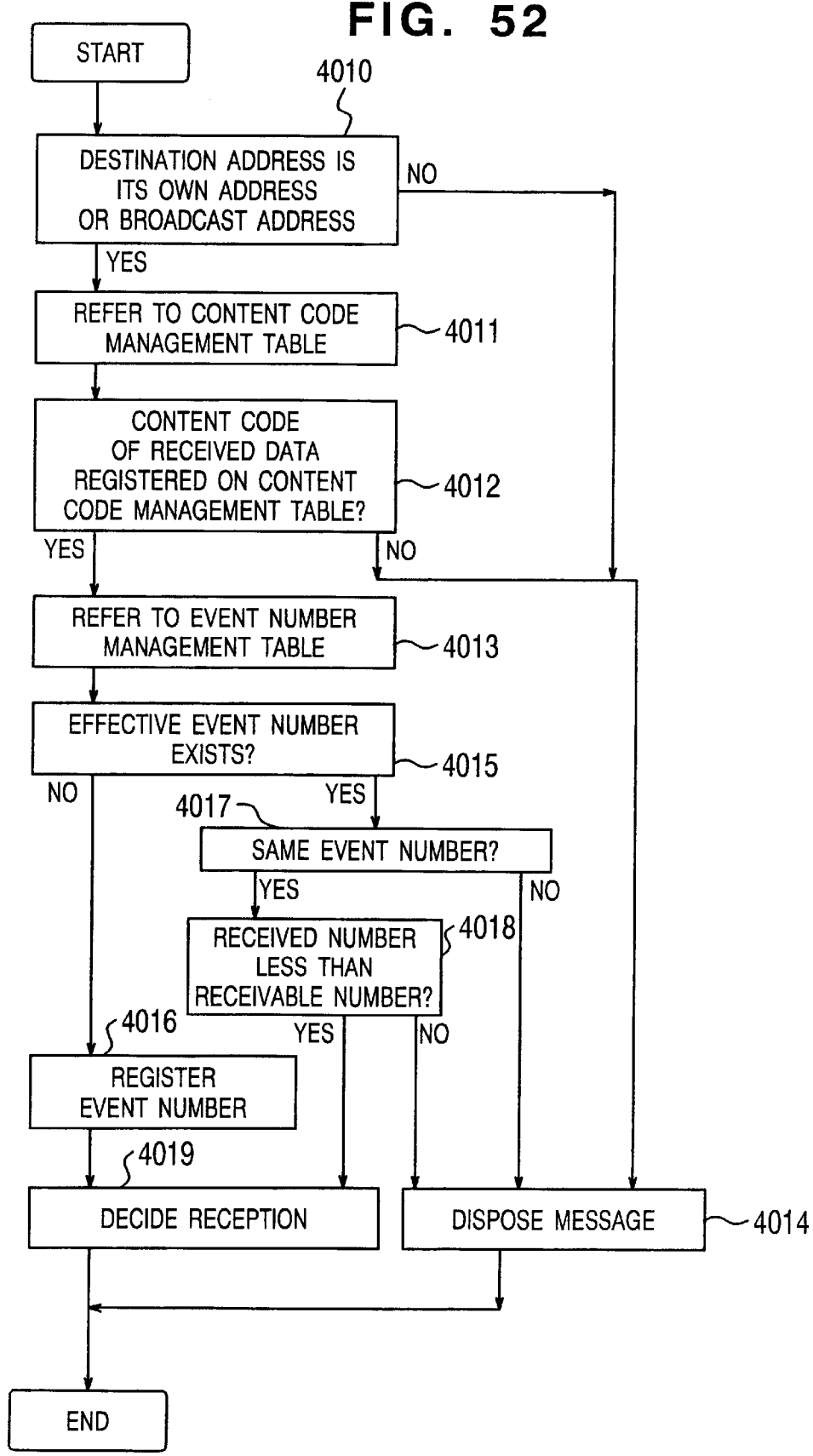
Figure 53:
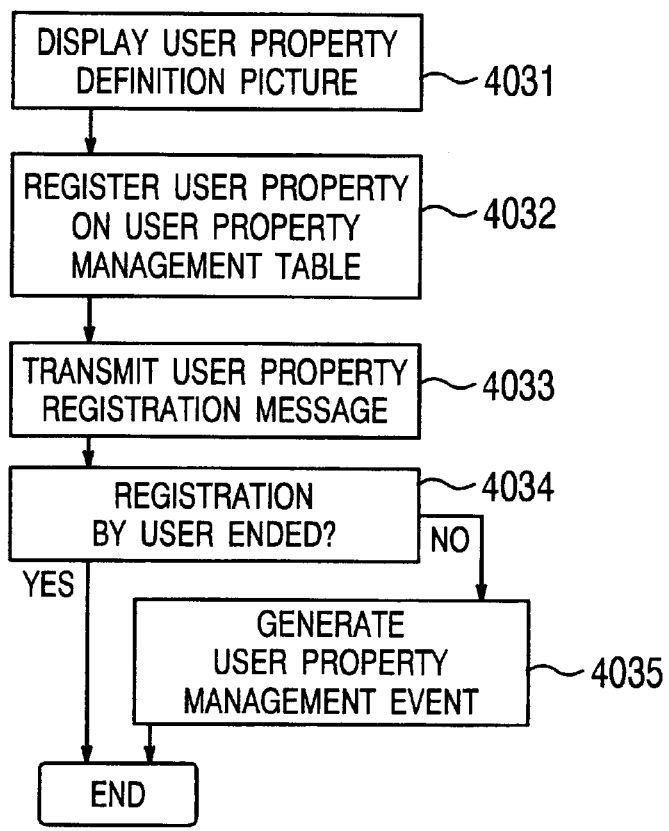
Figure 54:
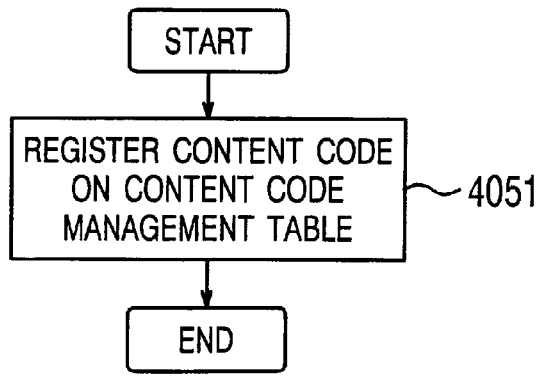

FIG. 30 is a flowchart showing an example of a main processing in a term management function of the data receiving equipment;

FIG. 31 is a flowchart showing an example of a main processing in a content code management function of the data receiving equipment;

FIG. 32 is a flowchart showing an example of a main processing in a data execution function of the data receiving equipment;

FIG. 33 is a diagram showing an example of a user property define picture of the data receiving equipment;

FIG. 34 is a diagram showing an example of a user property management table of the data receiving equipment;

FIG. 35 is a diagram showing an example of a content code management table of the data receiving equipment;

FIG. 36 is a diagram showing an example of an event number management table of the data receiving equipment;

FIG. 37 is a diagram showing another example of a message format of a data message;

FIG. 38 is a block diagram showing an example of a system according to another embodiment of the present invention;

FIG. 39 is a functional block diagram showing examples of functions of data sending equipment according to another embodiment of the present invention;

FIG. 40 is a flowchart showing an example of a main processing in the data sending equipment according to another embodiment of the present invention;

FIG. 41 is a flowchart showing an example of a main processing in a term management function in the data sending equipment according to another embodiment of the present invention;

FIG. 42 is a flowchart showing an example of a user property management function in the data sending equipment according to another embodiment of the present invention;

FIG. 43 is a diagram showing an example of a user property management table in the data sending equipment according to another embodiment of the present invention;

FIG. 44 is a diagram showing an example of a strategy define picture in the strategy management function of the data sending equipment according to another embodiment of the present invention;

FIG. 45 is a diagram showing an example of a message format of a property registration message according to another embodiment of the present invention;

FIG. 46 is a diagram showing an example of a message format of a user property registration message according to another embodiment of the present invention;

FIG. 47 is a diagram showing an example of a message format of a content code registration message according to another embodiment of the present invention;

FIG. 48 is a diagram showing an example of a message format of a data message according to another embodiment of the present invention;

FIG. 49 is a diagram showing a message sequence between data sending equipment and data receiving equipment according to another embodiment of the present invention;

FIG. 50 is a functional block diagram showing examples of functions of the data receiving equipment according to another embodiment of the present invention;

FIG. 51 is a flowchart showing an example of a main processing in the data receiving equipment according to another embodiment of the present invention;

FIG. 52 is a flowchart showing an example of a main processing in the message selective receiving function of the data receiving equipment according to another embodiment of the present invention;

FIG. 53 is a flowchart showing an example of a main processing in the user property management function of the data receiving equipment according to another embodiment of the present invention; and FIG. 54 is a flowchart showing an example of a main processing in the content code management function of the data receiving equipment according to another embodiment of the present invention.

DESCRIPTION OF THE PREFERRED EMBODIMENTS

Embodiments of the present invention will be described hereinafter.

Figure 1:
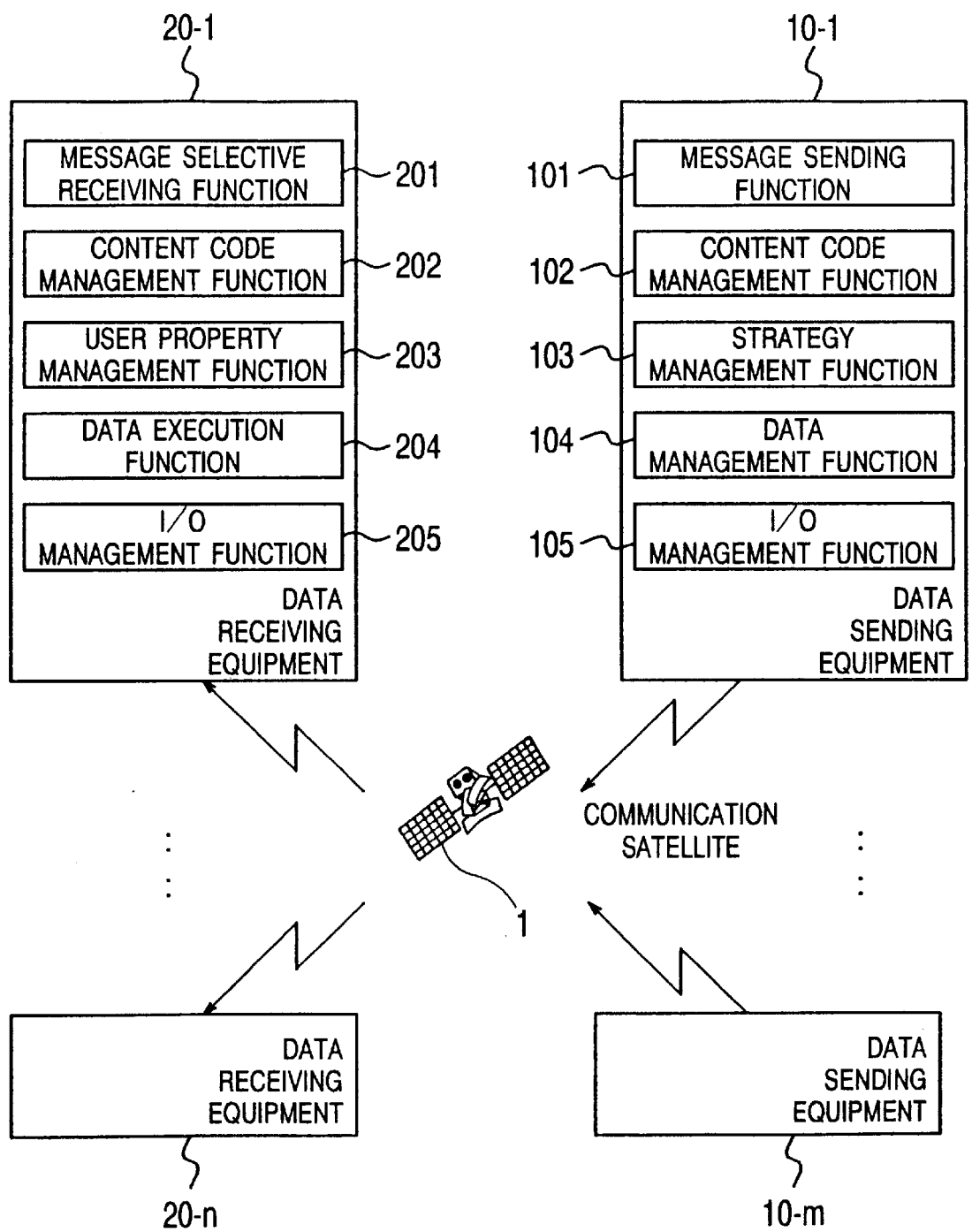
FIG. 1 is a block diagram showing an example of a system according to an embodiment of the present invention.

FIG. 1 is a block diagram showing a system according to an embodiment of the present invention.

As shown in FIG. 1, the system according to the present invention comprises more than one data sending equipment 10-1, 10 . . . , 10-m, more than one data receiving equipment 20-1, . . . , 20-n and a communication satellite 1 provided as a medium to enable these equipment to communicate with each other. The communication medium may be realized in the form of a radio system in this embodiment or a wire system.

Each of the data sending equipment 10 includes five fundamental functions of a message sending function 101, a content code management function 102, a strategy management function 103, a data management function 104 and an input and output (I/O) function 105.

Each of the data receiving equipment includes five fundamental functions of a message selective receiving function 201, a content code management function 202, a user property management function 203, a data execution function 204 and an input and output (I/O) function 205.

Figure 2:
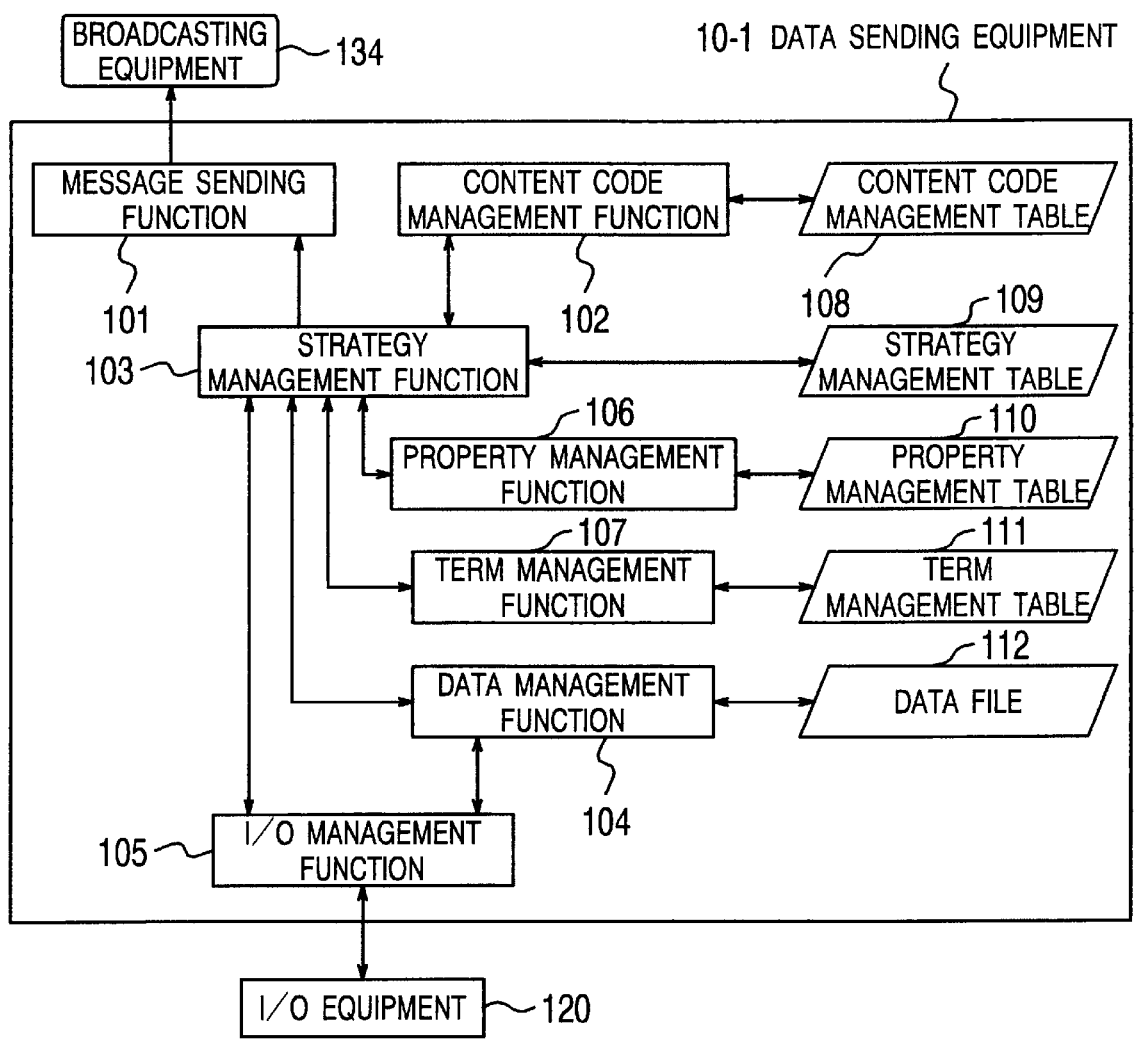
FIG. 2 is a functional block diagram showing examples of functions of data sending equipment.

FIG. 2 shows functions of the data sending equipment 10 more in detail. As shown in FIG. 2, the data sending equipment 10 includes, in addition to the above-mentioned five fundamental functions of the message sending function 101, the content code management function 102, the strategy management function 103, the data management function 104 and the I/O function 105, a property management function 106, a term management function 107, a content code management table 108, a strategy management table 109, a property management table 110, a term management table 111 and a data file 112. The message sending function 101 broadcasts a message through a broadcasting equipment 134 to the communication satellite 1 which is a transmission medium. In this case, a broadcast instruction is either requested to the operating system as described later, or issued directly. Also, the input and output management function 105 manages the input and output to and from the I/O equipment 120 such as a display, a keyboard, a disk and a communication equipment. In this case, an I/O instruction is either requested to the operating system as described later, or issued directly.

Figure 3:
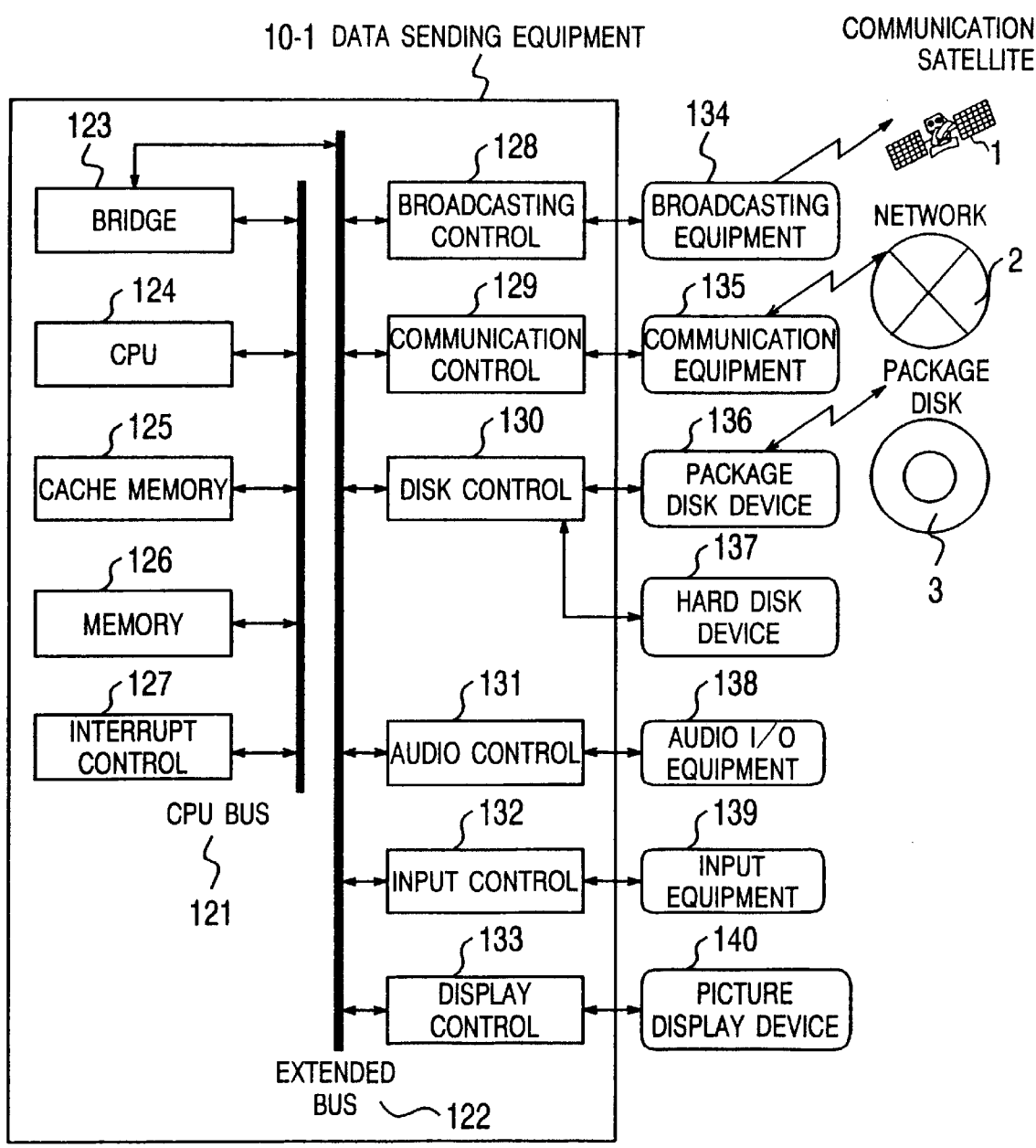
FIG. 3 is a block diagram showing an example of a hardware of the data sending equipment.

FIG. 3 shows the hardware of the data sending equipment 10 more in detail. As shown in FIG. 3, the data sending equipment 10 comprises a CPU bus 121, an extended bus 122, a bridge 123, a CPU (central processing unit) 124, a cache memory 125, a memory 126, an interrupt control 127, a broadcasting control 128, a communication control 129, a disk control 130, an audio control 131, an input control 132 and a display control 133. Each of the cache memory 125 and the memory 126 includes a controller, and the memory 126 includes a ROM (read-only memory) and a RAM (random-access memory).

The CPU bus 121 is a bus to which the CPU (central processing unit) 124 is connected.

The CPU 121 is connected with the bridge 123, the CPU 124, the cache memory 125, the memory 126 and the interrupt control 127.

There is a case where an operating system is mounted on the data sending equipment 10 so that the programs for executing the functions may operate hardware of the equipment 10 not directly but via the operating system. In such a case, each of the programs issues output instructions to and receives inputs from the operating system.

The CPU 124 interprets and executes a command, and the memory 126 memorizes a program and data. The cache memory 125 is a device which realizes a high-speed memory access. The interrupt control 127 is a control unit which manages an interrupt signal to the CPU, i.e. a signal for temporarily interrupting the present processing of the CPU and which requests the execution of its own interrupt processing. The bridge 123 is a circuit for connecting the CPU bus 121 and the extended bus 122.

The extended bus 122 is a bus for transferring data between a variety of I/O equipment. The extended bus 122 is connected with the broadcasting control 128, the communication control 129, the disk control 130, the audio control 131, the I/O control 132, and the display control 133. The broadcasting control 128 is a control unit for controlling a broadcasting using the communication satellite 1, and connected to the broadcasting equipment 134 for sending broadcast radio waves to the communication satellite 1. The communication control 129 effects a control when a communication is made with other equipment (other data receiving equipment 20 and the data sending equipment 10) through the communication equipment 135 such as a modem and a terminal adapter of ISDN (Integrated Services Digital Network) and the network 2 such as a public network and an ISDN network. The disk control 130 is a disk control unit such as an SCSI (Small Computer System Interface), and connected to a package disk device 136 such as a CD-ROM device and a DVD (Digital Video Disk) device for operating a package disk 3 which is an exchangeable recording medium and a hard disk device 137. The audio control 131 is a portion which controls the input and output of audio data, and connected to the audio I/O equipment 138 such as a microphone and a speaker. The input control 132 controls the input equipment 139 such as a keyboard and a mouse. The display control 133 controls a picture display equipment 140 such as a CRT (Cathode-Ray Tube), a LCD (Liquid-Crystal Display) and a PDP (Plasma Display Panel).

A relationship between the functions of FIG. 2 and the hardware of FIG. 3 will be described below. All functions of FIG. 2 are attained by the CPU 124 when the CPU 124 interprets and executes programs which realize respective functions. When the respective functions are executed, the corresponding programs exist in the memory 126 or the cache memory 125, and all tables and files of FIG. 2 exist in the memory 126 and the cache memory 125 when the respective functions are executed. When the respective functions are not executed, the programs, the tables and the files which realize the respective functions exist in the memory 126 and the hard disk device 137.

The message sending function 101 is interpreted by the CPU 124 and issues a command for controlling the broadcasting equipment 134 to the broadcasting control 128. Also, the I/O management function 105 is interpreted by the CPU 124 and controls the I/O equipment 120 such as the communication equipment 135, the package disk device 136, the hard disk device 137, the audio I/O equipment 138, the I/O equipment 139 and the picture display device 140 through the communication control 129, the disk control 130, the audio control 131, the input control 132 and the display control 133. These commands or instructions and controls are made directly to the respective hardware. However, they may be requested to the operating system.

Operations of the functions in the data sending equipment 10 will be described with reference to the drawings.

Figure 4:
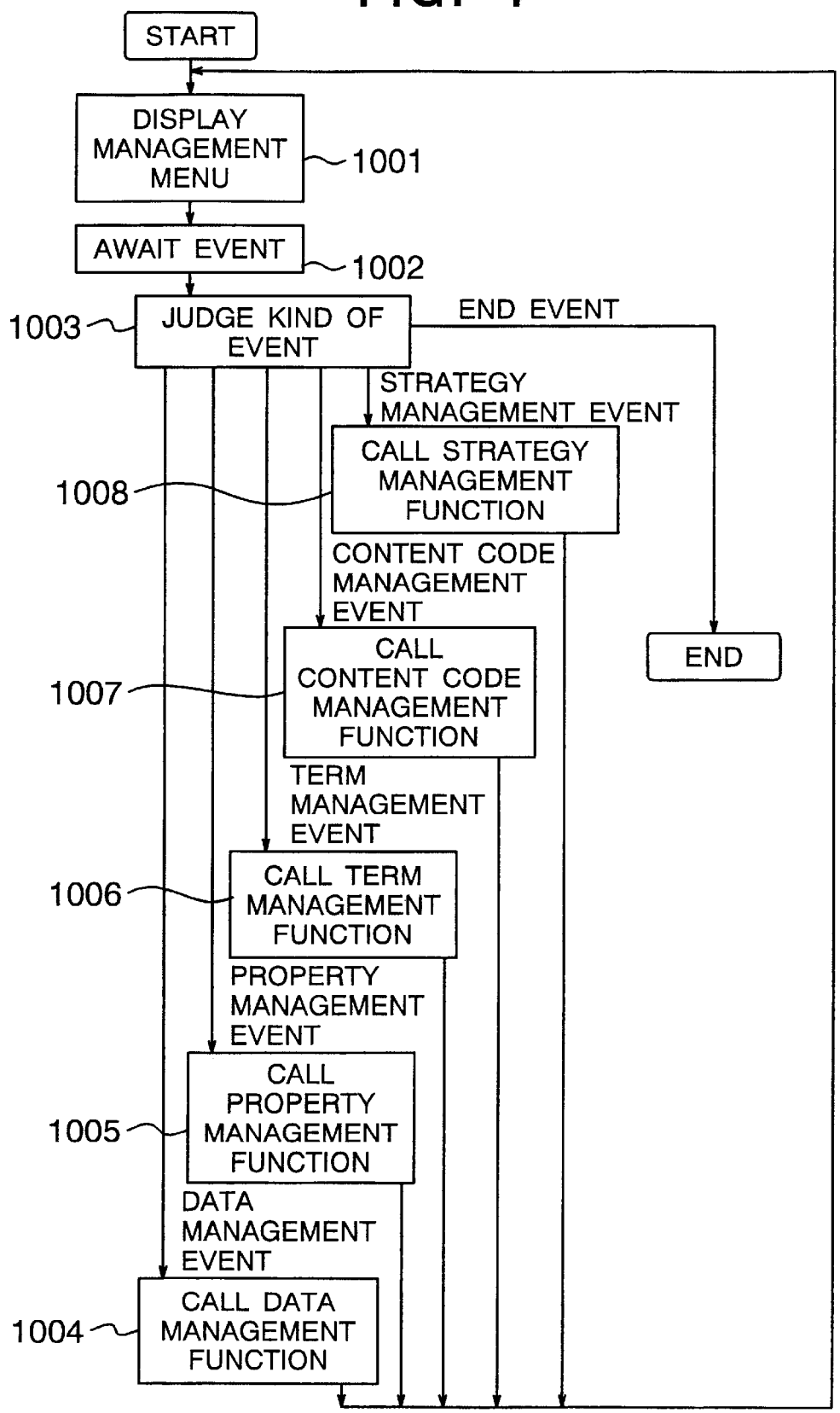
FIG. 4 is a flowchart showing an example of a main processing in the data sending equipment.

FIG. 4 is a flowchart of a main processing executed by the CPU 124 in the data sending equipment 10.

Referring to FIG. 4, and following start of operation, the I/O management function 105 of the data sending equipment 10 displays a management menu on the picture display device 140 (step 1001), and is placed in the event standby mode for awaiting an event (step 1002). Here, the event standby mode designates the state that the I/O management function 105 is placed in the standby mode for awaiting an event such as a clicking of a button, for example, and a reception of a message. A user of the data sending equipment 10 selects a desired function from the menu displayed on the picture display device 140 and enters data based on a desired market strategy.

FIG. 10 shows an example of the manner in which the above-mentioned management menu is displayed. As shown in FIG. 10, the management menu 113 includes a data management button 1131, a property management button 1132, a term management button 1133, a registration condition (content code) management button 1134, a strategy management button 1135, an end button 1136 and a help button 1137. When the user clicks the data management button 1131 by using the input device 139, there is generated a data management event. Similarly, when the user clicks the term management button 1133, there is generated a term management event. When the user clicks the registration condition (content code) management button 1134, there is generated a content code management event. When the user clicks the strategy management button 1135, there is generated a strategy management event. When the user clicks the end button 1136, there is generated an end event. Incidentally, when the user clicks the help button 1137, there is obtained a browser of each button.

Let it now be assumed that a market strategy officer who is the user of the data sending equipment 10 sets the strategy according to the following four procedures. The strategy is an intent of a market strategy officer (information provider) expressed by a condition portion and an execution portion, i.e. IF A (condition portion) THEN B (execution portion). The condition portion is a conditional expression concerning a property item. For example, the market strategy officer sets a particular merchandise designation such as to recommend a wine "BBB" which is a new product for the users if an age (property item) is over 20. Also, the market strategy officer sets a merchandise category designation such as to recommend a CD of jazz for the users if the users are in their thirties.

(1) Registration of merchandise information (data): Register data to be provided for the users on the information receiving side and a category of such data. In this case, the user of the data sending equipment 10 clicks the data management button 1131.

(2) Registration of property item: Register property items concerning the user of the information receiving side used when a strategy is set. A user profile (address, age, etc.), a taste (taste of alcoholic drinks, etc.), situation (time and date and place), etc. become property items. In this case, the user of the data sending equipment 10 clicks the property management button 1132.

(3) Registration of terms: Register expressions frequently used in the condition portion of the strategy as terms. The term of a kind of abbreviations or a macro. The term "twenties", for example, is defined and registered as "property of age is older than 20 and less than 30". In this case, the user of the data sending equipment 10 clicks the term management button 1133.

(4) Setting of strategy: Set a strategy for a particular merchandise or merchandise category. When a strategy is set to a merchandise category, one merchandise which belongs to that merchandise category is selected by some method (e.g. random-selection). In this case, the user of the data sending equipment 10 clicks the strategy management button 1135. Incidentally, if a new content code is set when the strategy is set, then in the data sending equipment 10, that content code is automatically registered on the content code management table 108.

Merchandise information is transmitted based on the strategy thus set. Incidentally, the four procedures are not the sequential procedures and any of the four procedures may be executed solely. Incidentally, the user of the data transmitting equipment 10 is able to generate the content code in a manual fashion by clicking the content code management button 1134 and register the content code thus generated on the content code management table 108.

The manner in which the system is operated when the user generates events by clicking the respective buttons in accordance with the above-mentioned four procedures will be described.

(1) The case in which the user of the data sending equipment 10 generates a data management event by clicking the data management button 1131 of the management menu 113 will be described with reference to FIGS. 2, 4, 5 and 11.

In FIG. 2, the I/O management function 105 of the data sending equipment 10 judges the kind of event (step 10003). Since the event is the data management event, the I/O management function 105 calls the data management function 104 through the strategy management function 103 (step 1004).

Figure 5:
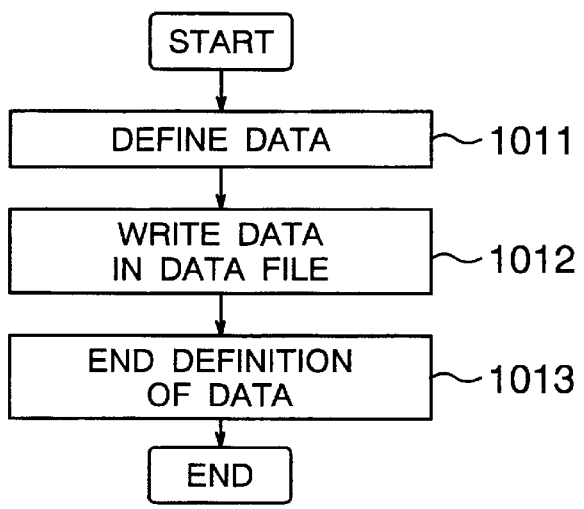
FIG. 5 is a flowchart showing an example of a main processing in a data management function in the data sending equipment.

FIG. 5 is a flowchart showing a main processing executed by the called data management function 104. Referring to FIG. 5, and following the start of operation, initially, a data define picture is displayed, and the user (strategy officer on the sending side) enters data definition (step 1011). Based on the entered data definition, the inputted data is written in the data file 112 (step 1012). When the user ends the data definition, the data management function 104 ends the processing (step 1013).

FIG. 11 shows an example of a structure of the data file 112. As shown in FIG. 11, the data file 112 includes four fields of a data number 1121, a data name 1122, a category 1123 and a data file name 1124. The user (strategy officer on the sending side) defines the four items. The data number is a number to identify data uniquely, and the data number is frequently comprised of a combination of a code (e.g. high-order three digits of "10001") of data owner (owner company) and a data number (e.g. low-order two digits of "10001"). The data name 1122 is typically a trade name. The category 1123 indicates a category (classification) to which data belongs. The data file name indicates data itself. Data is a so-called hybrid-type file composed of a plurality of files, e.g. hypertext. As simple data, there is text file data.

(2) The case in which a property management event is generated when the user of the data sending equipment 10 clicks the property management button 1132 of the management menu 113 will be described with reference to FIGS. 2, 4, 6 and 12.

In FIG. 2, the I/O management function 105 of the data sending equipment 10 judges the kind of events (step 1003). Since the event is the property management event, the I/O management function 105 calls the property management function 106 through the strategy management function 103 (step 1005).

Figure 6:
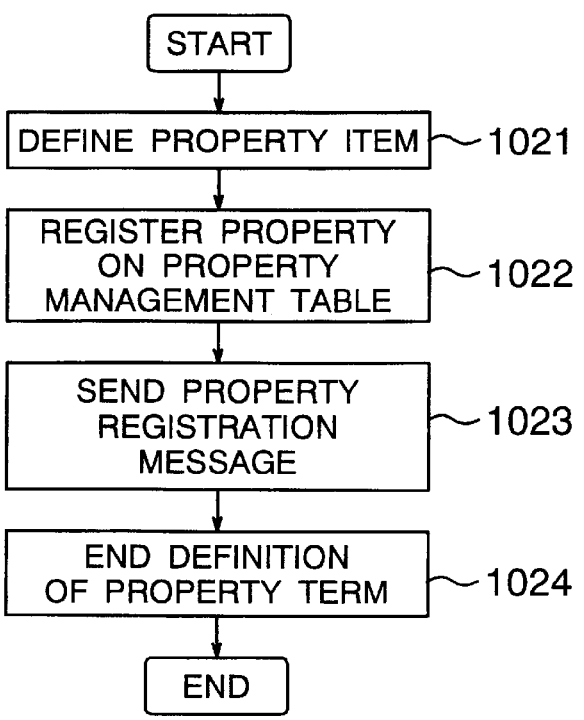

FIG. 6 is a flowchart showing a main processing in the called property management function 106. Referring to FIG. 6, and following the start of operation, initially, a property define picture is displayed, and the user (strategy officer on the sending side) enters a property definition (step 1021). Based on the inputted property definition, the inputted property item is written in the property management table 110 (step 1022). Also, the property management function 106 sends a property registration message by using the message transmission function 101 through the strategy management function 103 (step 1023). When the user ends the property definition, the property management function 106 ends the processing (step 1024). The property registration message will be described later on.

FIG. 12 shows an example of a structure of the property management table 110. As shown in FIG. 12, the property management table 110 includes three fields of a property code 1101, a property item name 1102, and a property value limit 1103. The user (strategy officer on the sending side) defines the three items. The property code 1101 is a code used to uniquely identify the property items. The property item name indicates a name of a property item literally. The property value limit 1103 is used to standardize the form of a value that can be taken by the property item as a property value. The property value limit 1103 is equivalent to a type definition of a computer language. For example, {male, female} indicates that only the value of either male or female can be taken. As the property items, it is possible to define everything concerning the user of the data receiving equipment 20.

For example, it is possible to define a user profile, i.e. fixed or semi-fixed property such as address and age, a user's taste, i.e. changeable property such as taste and likes and dislikes and a user situation, i.e. user environment property such as staying at home/in the office and morning/afternoon. The property values of these properties can be set when the user of the data receiving equipment 20 directly designates and enters or automatically set by the data receiving equipment 20 (present time of user or the like can be set with ease).

(3) The case in which the term management event is generated when the user of the data sending equipment 10 clicks the term management button 1133 of the management menu 113 will be described with reference to FIGS. 2, 4, 7 and 13.

In FIG. 2, the I/O management function 105 of the data sending equipment 10 judges the kind of the events (step 1003 in FIG. 4). Since the event is the term management event, the I/O management function 105 calls the term management function 107 through the strategy management function 103.

FIG. 7 is a flowchart showing a main processing in the called term management function 107. Referring to FIG. 7, and following the start of operation, initially, a term define picture is displayed, and the user (strategy officer) enters a term definition (step 1031). Based on the inputted term definition, the inputted term is written in the term management file 111 (step 1032). Also, the term management function 107 transmits a term registration message by using the message sending function 101 through the strategy management function 103 (step 1033). When the user ends the term definition, the term management function 107 ends the processing (step 1034). The term registration message will be described later on.

FIG. 13 shows an example of a structure of the term management table 111. As shown in FIG. 13, the term management table 111 includes three fields of a term code 1111, a term name 1112 and a term definition 1113. The term code 1111 is a code which is used to uniquely identify the terms. The term name is literally a name of a term. The term definition 1113 is a definition of a term. The user (strategy officer on the sending side) defines three items. The term is a kind of abbreviations A or a macro. A word "twenties", for example, indicates that "an age property is older than 20 and less than 30". Also, concerning the same property of "age", "an age property is older than 10 and less than 30" can be defined as "young people". As described above, according to the term, one property item can be defined/classified by a plurality of cut ends.

Further, "include 'TOKYO' in address" which is a definition of a term "TOKYO" indicates that "a property value of a property of an address contains 'TOKYO'". If "TOKYO" is contained in the property value, then the term is true. If not, then the term is false. Furthermore, terms concerning a plurality of property items can be defined. A term "male drinker" may be defined as "alcoholic drink=yes and sex=male" by using the property item name shown in FIG. 12.

(4) The case in which the strategy management event is generated when the user of the data sending equipment 10 clicks the strategy management button 1135 will be described with reference to FIGS. 2, 4, 8, 9, 14, 15 and 16.

In FIG. 2, the I/O management function 105 of the data sending equipment 10 judges the kind of events (step 1003 in FIG. 4). Since the event is the strategy management event, the I/O management function 105 calls the strategy management function 103 (step 1008).

FIG. 9 is a flowchart showing a main processing in the accessed strategy management function 103. Referring to FIG. 9, and following the start of operation, initially, a strategy define picture is displayed, and the user (strategy officer on the sending side) enters a strategy definition (step 1051).

FIG. 14 shows a strategy definition picture 114. Initially, there is selected a data name 1141 or a data code 1142 of data (or merchandise data) of which the strategy is desired to be set. Then, a user (person who receives data) to which data is provided is entered. The property item 1143 that has already been registered is selected, and the property value is selected or entered repeatedly. For example, the display state of FIG. 14 shows that data "AAA chocolate" of the data code "10001" is recommended to "sex=female & TOKYO=twenties" as a strategy. Initially, the content code management function 102 is called based on inputted data (step 1052 in FIG. 9).

FIG. 8 is a flowchart showing a main processing in the content code management function 102 called at the step 1052 in FIG. 9. Referring to FIG. 8, and following the start of operation, initially, the content code management function 102 automatically defines and creates a content code in accordance with the strategy condition (e.g. "sex=female & TOKTO=twenties") supplied at the step 1052 in FIG. 9 (step 1041). If the same strategy condition has already been registered on the content code management table 108, then the content code management function 102 would not automatically define and create the content code. Then, the content code thus defined and created is automatically registered on the content code management table 108 (step 1042). The above-mentioned strategy condition, for example, is registered on the content code management table 108 as a content code "102" shown in FIG. 16.

Then, the content code management function 102 broadcasts a content code registration message to the data receiving equipment-20 by using the message sending function 101 through the strategy management function 103 (step 1043). When the content code definition is automatically ended, the content code management function 102 ends the processing (step 1044). The content code message will be described later on.

FIG. 16 shows an example of a structure of the content code management table 108. As shown in FIG. 16, the content code management table 108 includes 7 fields of a content code 1081, contents defined in the content code, i.e. a strategy condition 1082, a state 1083, a registration time 1084, a pause time 1085, a resume time 1086 and a delete time 1087. The user (strategy officer on the sending side) only designates the strategy condition 1082 on the strategy define picture 114, and the remaining 6 fields are generally designated by the content code management function 102 automatically.

With respect to the content code 1081, for example, a code, which is not in use, may be assigned to a new content code. A present time may be set to the registration time 1084, and a time which is 6 months later of the registration time may be set to the pause time 1085. A blank ("−") may be set to the resume time 1086, and the delete time 1087 may be determined by a default in such a manner that a time which is one year later of the pause time 1085 is set to the delete time 1087. It is needless to say that the strategy officer may set the code of the content code and a variety of time of the content code by clicking the registration condition (content code) management button 1134 in a manual fashion.

The content code 1081 is a code expressing the contents of the defined code. The strategy condition expresses the condition of the strategy for providing data to the users and also expresses the meaning of the content code at the same time. Data with a content code "101" added thereto, for example, indicates that the data content is for "thirties & sex=male". Stated otherwise, the content code "101" may be added to the data for "thirties & sex=male" and then the data with the content code "101" may be broadcast.

The state field 1083 expresses the present defined state of the content code 1081 which changes in the form of "beginning (=before registration)"→"registration"Δ→"pause"→"beginning (=after deletion)". Before registration and after deletion, since the item concerning the corresponding content code does not exist on the content code management table 108, the beginning state is not displayed on the state field 1083. The state field 1083 is changed from the beginning state to the registration state by the content code registration processing, changed from the registration state to the pause state by the pause processing, changed from the pause state to the registration state by the resume processing, and changed from the pause state to the beginning state by the delete processing (the state field 1083 is inhibited from being directly changed from the registration state to the beginning state (after deletion) for the sake of safety). The registration time field 1084, the pause time field 1085, the resume time field 1086 and the delete time field 1087 express times (history or plan) of registration, pause, resume and delete, respectively.

Let it be assumed that the present time and date are Dec. 2, 1996. Then, the content code "101" is registered on Nov. 1, 1996, will be paused on May 1, 1997 and will be deleted on May 2, 1998. The field "−" indicates that there is no plan.

The content code management table 108 has several content codes which are set from the start, i.e. which are registered as system content codes. In FIG. 16, the content codes following "099" are those system content codes. The user need not register these system content codes. It is to be noted that the content codes used in this embodiment are used to identify not only the strategy conditions but also the types of the sending message.

When the processing of the content code management function 102 accessed at the step 1052 in FIG. 9 is ended, control goes back to the strategy management function 103. The strategy management function 103 registers a strategy on the strategy management table 109 shown in FIG. 15 (step 1053). Thereafter, a data message with a proper content code added thereto is created based on the strategy management table 109, and the resultant data message is broadcast at a designated time (step 1054). When the user ends the strategy definition, the strategy management function 103 ends the processing (step 1055). The data message will be described later on.

FIG. 15 shows an example of a structure of the strategy management table 109. As shown in FIG. 15, the strategy management table 109 includes 5 fields of a strategy number 1091, a data number 1092, a content code 1093 and an event number 1094 and a broadcast time 1095. The user (strategy officer on the sending side) is able to explicitly designate the data number 1092, the event number 1094 and the broadcast time 1095 and to explicitly designate the content code (led out from the strategy condition) by designating a merchandise (data) number 1142, an event number 1145 and a broadcast time 1146 on the strategy define picture 114 (FIG. 14).

The strategy number 1091 is a number which is used to uniquely identify strategies, and is automatically set by the strategy management function 103. The data number 1092 expresses the data number of the data on which the strategy is designated. The content code 1093 explicitly expresses the strategy condition 1082. The event number 1094 is the number which expresses that data are synchronized with each other during a constant period, and is used to collect a plurality of strategies having a plurality of strategy numbers in such a manner that data message broadcasts of these data may be synchronized with each other at a certain time or a certain period of time. The event number 1094 is effective when the strategies having the same event number compete with other (will be described later on). The event number 1094 is a unique number for the system. When the unique number is assigned to the system, the event number is generally created as "112233+19961203123456000+00013", for example, by the combination of three of a terminal unique ID, a time and date and a serial number. For simplicity, the event number is described only by the serial number (e.g. "13"). The broadcast time 1095 sets a time at which data message is to be broadcast after the strategy was registered.

The above-mentioned respective messages which are broadcast from the data sending equipment 10 to the data receiving equipment 20 will be described below.

The property registration message (step 1023 in FIG. 6), the term registration message (step 1033 in FIG. 7) and the content code registration message (step 1043 in FIG. 8) are respectively immediately broadcast as soon as they are set as described above. It is needless to say that these messages are not immediately broadcast but they may be broadcast together after a constant time or at a constant time interval. The data message is broadcast at a broadcast time designated on the strategy define picture 114 (FIG. 14). If the broadcast time is not designated, the data message is broadcast immediately.

FIG. 17 shows a format of a property registration message. As shown in FIG. 17, the property registration message comprises a content code 1151, an event number 1152, a serial number 1153, a property code 1154, a property name 1155 and a property value limit 1156. The property registration content code "011" is set to the content code 1151 as shown in FIG. 16. A number "0" which means nullity is set to the event number 1152. The serial number 1153 is a message serial number of the event number unit added upon broadcast. When the event number is null, a value which indicates nullity, e.g. "1/E" is entered into the serial number. The respective fields of the property management table 110 (FIG. 2) are copied to the property code 1154, the property name 1155 and the property value limit 1156. The data receiving equipment 20 receives the property registration message and stores the property code 1154, the property name 1155 and the property value limit 1156 of such property registration message in its own property management table 110.

FIG. 18 shows a format of a term registration message. As shown in FIG. 18, the term registration message comprises a content code 1151, an event number 1152, a serial number 1153, a term code 1157, a term name 1158 and a term definition 1159. A term definition content code "021" is set to the content code 1151 as shown in FIG. 16. A number "0" which means nullity is set to the event number. The serial number 1153 is a message serial number of the event number unit added upon broadcasting. When the serial number is null, a value which indicates nullity, e.g."1/E" is entered into the serial number 1153. The respective fields of the term management table 111 (FIG. 13) are copied to the term code 1157, the term name 1158 and the term definition 1159. When receiving the term registration message, the data receiving equipment 20 stores the term code 1157, the term name 1158 and the term definition 1159 in its own term management table 111.

FIG. 19 shows a format of a content code registration message. As shown in FIG. 19, the content code registration message comprises a content code 1151, an event number 1152, a serial number 1153, a registered content code 1160 and a strategy condition 1161. A content code registration content code "001" is set to the content code 1151 as shown in FIG. 16. A number "0" which means nullity is set to the event number 1152. The serial number 1153 is a message serial number of an event number unit added upon broadcasting. When the event number is null, a value which means nullity, e.g. "1/E" is entered into the serial number 1153. The respective fields of the content code management table 108 (FIG. 16) are copied to the registered content code 1160 and the strategy condition 1161. When receiving the content code registration message, the data receiving equipment 20 determines based on its own user property whether or not the user is applicable to the strategy condition within the message. If the user is applicable to the strategy condition, then the data receiving equipment 20 registers the content code 1160 and the strategy condition 1161 on its own content code management table 108.

FIG. 20 shows a format of a data message. As shown in FIG. 20, the data message comprises a content code 1151, an event number 1152, a serial number 1153 and data 1162. The event number 1094 in the strategy management table 109 (FIG. 15) is respectively set to the content code 1151 and the event number 1152. The serial number 1153 is a message serial number of an event number unit added upon broadcasting. When the event number is effective, the serial number 1153 become serial and is used to confirm the last message in order to detect a dropout of a message. Data corresponding to the data number registered on the strategy management table 109 (FIG. 15) is obtained from the data file 112 (FIG. 11) and set to the data 1162. The data 1162 is text data expressing a merchandise advertising message displayed on the data receiving equipment 20, for example.

Although there are many other messages such as a registration message, a pause message, a resume message, a delete message and a change message, by way of example, a format of a content code delete/pause message is shown in FIG. 21, and a format of a content code change message is shown in FIG. 22. A content code 1163 in FIG. 21 shows a delete or pause content code. A content code 1164 in FIG. 22 shows a content code before changed, and a content code 1165 shows a content code after changed.

FIG. 23 shows in the form of a time series an example of a message broadcast from the data sending equipment 10 to the data receiving equipment 20-1, . . . , 20-n when the strategy officer executes the above-mentioned four procedures.

Initially, let it be assumed that the user of the data receiving equipment 10 sets a property item and a property item "address" is registered on the property management table 110 by the property management function 106. Then, a property registration message 1171 is broadcast from the data sending equipment 20 through the communication medium 1 to the data receiving equipment 20.

Then, let it be assumed that the user of the data sending equipment 20 sets a term and a term "TOKYO" is registered on the term management table 111 by the term management function 107. Then, a term registration message 1172 is broadcast from the data sending equipment 20 through the communication medium 1 to the data receiving equipment 10.

The sending messages 1171 and 1172 are used to set the property registration message and the term registration message to the respective tables in the data receiving equipment 20.

Then, let it be assumed that the content code management function 102 sets three strategies of a strategy condition "thirties & sex=male" (i.e. content code "101"), a strategy condition "twenties & sex=female & TOKYO" (i.e. content code "102") and a strategy condition "unconditional" (i.e. content code "099"). Further, let it also be assumed that the user of the data sending equipment 10 set the three strategies to the same event number "13". Then, if content codes "101" and "102" are newly registered on the content code management table 108 (content code "099" is set as a default by the system content code), content code registration messages 1173, 1174 are broadcast from the data sending equipment 10 through the communication medium 1 to the data receiving equipment 20.

The content code registration messages 1173, 1174 are selectively received by the data receiving equipment 20 of the user which is applicable to the strategy condition within the message, respectively.

Thereafter, based on a sending time 1095 designated by the strategy management table 109 in the data sending equipment 10, data messages 1175, 1176, 1177 are broadcast from the data sending equipment 10 through the communication medium 1 to the data receiving equipment 20. Since these three messages 1175, 1176, 1177 have the same event number added thereto, they are broadcast from the data sending equipment 10.

The data receiving equipment 20 will be described next.

FIG. 24 is a functional block diagram of the data receiving equipment 20 more in detail. As shown in FIG. 24, the data receiving equipment 20 includes, in addition to the five fundamental functions a message selective receiving function 201, a content code management function 202, a user property management function 203, a data execution function 204, an I/O management function 205, a property management function 206, a term management function 207, a content code management table 208, a user property management table 209, a property management table 210, a term management table 211 and an event number management table 212. The message selective receiving function 201 receives a message from the communication satellite 1 serving as the transmission medium through a broadcast receiving equipment 234. In this case, a receiving instruction is either requested to the operating system as described later, or issued directly. Also, the I/O management function 205 manages the input and output to and from an I/O equipment 220 of a communication equipment such as a display, a keyboard and a disk. In this case, an I/O instruction is either requested to the operating system as described later, or issued directly.

FIG. 25 is a block diagram showing the hardware of the data receiving equipment 20. As shown in FIG. 25, the data receiving equipment 20 comprises a CPU bus 221, an extended bus 222, a bridge 223, a CPU (Central Processing Unit) 224, a cache memory 225, a memory 226, an interrupt control 227, a broadcast reception control 228, a communication control 229, a disk control 230, an audio control 231, an input control 232, a display control 233. Each of the cache memory 225 and the memory 226 includes a controller, and the memory 226 includes a ROM and a RAM.

The CPU bus 221 is a bus to which there is connected the CPU (Central Processing Unit) 224.

To the CPU bus 221, there are connected the bridge 223, the CPU 224, the cache memory 225, the memory 226 and the interrupt control 227.

The CPU 224 interprets a command and the memory 226 memorizes a program and data. The cache memory 225 is a device which realizes a high-speed memory access. The interrupt control 227 is a control unit for managing an interrupt signal to the CPU, i.e. signal for temporarily interrupting the present processing of the CPU and which requests its own interrupt processing. The bridge 223 is a circuit for connecting the CPU bus 221 and the extended bus 222.

The extended bus 222 is a bus for transferring data among a variety of I/O devices. To the extended bus 222, there are connected a broadcast reception control 228, a communication control 229, a disk control 230, an audio control 231, an input control 232, and a display control 233. The broadcast reception control 228 is a control unit which controls the reception of broadcast using the communication satellite 1 and is connected to the broadcast receiving equipment 234 which receives broadcast radio waves from the communication satellite 1. The communication control 229 effects a control when a communication to other equipment (other data receiving equipment 20 and data sending equipment 10) is made through a communication equipment 235 such as a modem and an ISDN terminal adapter and the network 2 such as a public network and ISDN network. The disk control 230 is a disk control unit such as an SCSI and is connected to a package device 236 such as a CD-ROM device and a DVD device which can operate the package disk 3 serving as the exchangeable recording medium, a hard disk device 237 and an IC card device 238. The audio control 231 is a control unit for controlling the input and output of audio data and is connected to an audio I/O device 239 such as a microphone and a speaker. The input control 232 controls an input device 240 such as a keyboard and a mouse. The display control 233 controls a picture display device 241 such as a CRT, an LCD and a PDP.

A relationship between the functions of FIG. 24 and the hardware of FIG. 25 will be described below. All functions in FIG. 24 can be attained when the CPU 224 interprets and executes the programs which realize the respective functions. When respective functions are executed, corresponding programs exist in the memory 226 and the cache memory 225. Also, when respective functions are executed, all tables and files in FIG. 4 exist in the memory 226 or the cache memory 225. When the respective functions are not executed, the programs, the tables and the files which can realize the respective functions are all existing in the hard disk device 237 or the IC card device 238. In particular, a user property management table is retained in the IC card. If so, when the same data receiving equipment 20 is commonly shared by a plurality of users, each user can set a user property suitable for each user by exchanging its own IC card.

There is a case where an operating system is mounted on the data receiving equipment 20 so that the programs for executing the functions may operate hardware of the equipment 20 not directly but via the operating system. In such a case, each of the programs issues output instructions to and receives inputs from the operating system.

The message receiving function 201 is interpreted by the CPU 224 and issues a command to the broadcast reception control 228 for controlling the broadcast reception equipment 234. Also, the I/O management function 205 is interpreted by the CPU 224 and controls the I/O equipment 220 such as the communication equipment 235, the package disk device 236, the harddisk device 237, the IC card device 238, the audio I/O device 239, the input device 240 and the picture display device 241 through the audio control 231, the input control 232 and the display control 233. These commands or instructions and controls are made directly to the respective hardware. However, they may be requested to the operating system.

The operations of the functions in the data receiving equipment 20 will be described below with reference to the drawings.

FIG. 26 is a flowchart showing a main processing executed by the CPU 224 in the data receiving equipment 20.

Referring to FIG. 26, and following the start of operation, the data receiving equipment 20 is placed in the standby mode for awaiting the event (step 2001).

Let it be assumed that a message is received by the data receiving equipment 20 from the broadcast receiving equipment 234 as shown in FIG. 23 and an event occurs. Then, when the event occurs, the data receiving equipment 20 judges the kind of event (step 2002). When receiving a message, the data receiving equipment 20 regards the reception of the message as a message reception event, and calls the message selective receiving function 201 (step 2003). The message selective receiving function 201 selectively receives a message.

FIG. 27 is a flowchart showing a main processing in the called message selective receiving function 201. Referring to FIG. 27, and following the start of operation, when receiving a message, the message selective receiving function 201 refers its own content code management table 208 in the data receiving equipment 20 shown in FIG. 35 (step 2011). Then, the message selective receiving function 201 judges whether or not the content code added to the received message is registered on its own content code management table 208 (step 2012). If the content code is not registered on the content code management table 208, then the message selective receiving function 201 disposes the message (step 2014). If the content code is registered on the content code management table 208, then the message selective receiving function 201 refers to the event number management table 212 (step 2013). Then, the message selective receiving function 201 judges whether or not an effective event number exists on the event number management table 212 (step 2015).

The effective event number means that a present time is contained between an event start time 2122 and an event end time 2123 of the event number. If there is not registered the effective event number, then an event number in the message is registered on the event number 2121 of the event number management table 212 (step 2016). A present time is set to the event start time 2122, and a time which results from adding a predetermined time to the present time is set to the event end time 2123. A predetermined number, e.g. "0" is set to the receivable number. Then, the reception of the message is decided (step 2019).

If the effective event number is registered on the event number management table 212, then it is determined whether or not the event number is the same event number as the message event number (step 2017). If the event number is not the same event number, then the message is disposed. If the event number is the same event number, then it is judged whether or not the number of the received message is less than the receivable number (step 2018). If on the other hand the number of the received message is not less than the receivable number, then the message is disposed. If the number of the received message is less than the receivable number, then the reception of the message is decided (step 2019). When the reception of the message is decided, the message is saved in an area such as a reception buffer in which a reception message is stored, and the received number 2125 is incremented by one. The event number is erased from the event number management table 212 when the event end time 2123 is ended.

If the receivable number of the event number table is set to "1", then it is possible to provide a data message of less than 2 to one user by using the event number in a certain time zone. Thus, when a plurality of messages are simultaneously transmitted to the data receiving equipment 20 from the data sending equipment 10 under the same strategy, if the data receiving equipment 20 side receives the corresponding messages of the previously-determined number for its own user, then the number of the received messages can be limited in such a manner that even though the following messages are applicable to the user, such messages are not received. Therefore, the user of the data sending equipment 10 is able to simplify the strategy condition by devising the order in which a plurality of messages are transmitted.

Referring back to FIG. 26, when the called message selective receiving function 201 ends the processing, then the data receiving equipment 20 accesses the content code management function 202, and judges the kind of the received message based on the content code (step 2004).

When the property registration message 1171 (content code "011"1) is received, the property management function 206 is called through the user property management function 203 (step 2005).

FIG. 28 is a flowchart showing a main processing in the called property management function 206. Referring to FIG. 28, and following the start of operation, the property management function 206 registers the received content in the proper management table 209 shown in FIG. 34 as it is (step 2021). Thereafter, the property management function 206 generates a user property management event so that the user may enter a property value (step 2022). The property management table 209 has exactly the same structure as the property management table 110 (FIG. 12) of the data sending equipment 10 and also has exactly the same content so long as a dropout of transmission does not occur when a message is sent and received. However, the property management table 209 differs from the property management table 110 in that the property value is entered by the user of each data receiving equipment 20 side.

The data receiving equipment 20 which received the user property management event judges the kind of the event (step 2002 in FIG. 26) and calls the user property management function 203 (step 2009).

FIG. 29 is a flowchart showing a main processing in the called user property management function 203. Referring to FIG. 29, and following the start of operation, initially, a user property define picture is displayed and urges the user of the data receiving equipment 20 side to enter a property value applicable to the user (step 2031).

FIG. 33 shows an example of a user property define picture 214. As shown in FIG. 33, the user property define picture 214 comprises a user name 2141, a user ID 2142, a property item 2143, a property value 2144, a done flag 2145, etc. The done flag 2145 indicates whether or not the user sets the property item. Herein, after receiving the property registration message, the user is urged to set a property value with respect to a property item of which the property value is not yet set. Accordingly, the user enters "MACHIDA 1-1, MACHIDA-SHI, TOKYO" within a limit of 40 two-byte characters or 80 one-byte characters of a property value into a property item "address", for example, or selects numerical values from 0 or positive integers, which are the limit of the property value with respect to the property item "age". At that time, the user may reject a definite setting. In this case, the user may select an item "reject answer" and set such item. Furthermore, the user may not enter the property item by clicking a cancel button because the user is busy.

After the user entered the property value, the user property management function 203 registers the property value entered by the user on the user property management table 209 (step 2032). FIG. 34 shows an example of a structure of the user property management table 209. As shown in FIG. 34, the user property management table 209 includes four fields of a property code 2091, a property item name 2092, a property value limit 2093 and a property value 2094. Thereafter, the user property management function 203 judges whether or not the registration of the property item by the user is ended, i.e. there exist a property item that is not yet set (step 2033) (the above-mentioned "reject answer" is not yet set but is set).

If the registration of the property item by the user is not ended, then the user property management function 203 generates a user property management event (step 2034) and urges the user to define a user property one more time. The user property management event is generated not immediately but after a constant time.

When the data receiving equipment 20 receives a term registration message 1172 (content code "021"), the term management function 207 is called through the user property management function 203 (step 20006 in FIG. 26).

FIG. 30 is a flowchart showing a main processing in the called property management function 206. Referring to FIG. 30, and following the start of operation, the received message content is registered on the term management table 211 as it is (step 2041). The term management table 211 has exactly the same structure as the term management table 111 (FIG. 13) of the data sending equipment 10, and also has the same content so long as a dropout does not occur when the message is sent or received.

When the data receiving equipment 20 receives a content code registration message 1173 or 1174 (content code "001"), the data receiving equipment 20 calls the content code management function 202 (step 2007 in FIG. 26).

FIG. 31 is a flowchart showing a main processing in the called content code management function 202.

Referring to FIG. 31, and following the start of operation, initially, the content code management function 202 refers to the user property management table via the user property management function 203 (step 2051). Then, it is determined by comparing the strategy condition in the message with its own referred user property whether or not the content code of the received message should be registered (step 2052). If necessary, the content code management function 202 refers to the term management table 211 via the term management function 207. For example, let it now be assumed that the user property management table 209 is set by the user as shown in FIG. 34. Herein, let it be assumed that the content code registration message 1174 shown in FIG. 23 is received. The strategy condition in the message is "twenties & sex=female & TOKYO". Initially, the content code management function 202 refers to the term management table 211, and translates the term into the property item and the property value. Specifically, the strategy condition is translated as "20≦age<twenties & sex=female & include 'TOKYO' in address". Then, the content code management function 202 refers to the user property management table 209 and judges that "age=26" is true, "sex=female" is true, and "address=MACHIDA-SHI TOKYO" is true. Thus, the content code management function 202 confirms that the strategy condition is satisfied. If the strategy condition is satisfied, the content code management function 202 registers the content code and the strategy condition on the content code management table 208 (step 2053). FIG. 35 shows an example of a structure of the content code management table 208 in the data receiving equipment 20. As shown in FIG. 35, the content code management table 208 includes a content code 2081, a strategy condition 2082 and a state 2083.

When the data receiving equipment 20 receives a data message, the data execution function 204 is called through the message selective receiving function 201 (step 2008 in FIG. 26).

FIG. 32 is a flowchart showing a main processing in the called data execution processing 204. Referring to FIG. 32, and following the start of operation, the content of the received message is displayed on the picture display device 241 in a real time fashion as a commercial as it is or the received content is written in the harddisk device 237 as a leaflet which will be called later on (step 2061).

In this fashion, the data message is transmitted from the data sending equipment 10 to the data receiving equipment 20-1 to 20-n. The content code is set in each data receiving equipment 20 based on each user property table 209 and each receiving equipment 20 selectively receives the message based on the content code.

While only the condition concerning the property of the user of the data receiving equipment is used as the strategy condition 1062 (FIG. 16) as described above, the content code that has already been registered may be used as the strategy condition by a method similar to that of the first embodiment. In this case, the strategy condition may be designated as "registered content code=105".

While the data message format used in the above-mentioned embodiment is shown in FIG. 20, the present invention is not limited thereto and an event number in a wide sense may be comprised of an event number, an event start time, an event end time and a receivable number as shown in FIG. 37. In this case, when the data receiving equipment 20 sets the event number management table 212 at the step 2016 in FIG. 27, the event number 2121, the event start time 2122, the event end time 2123 and the receivable number 2124 of the event number management table 212 are set based on the received message. Similar results can be obtained by a method using an event time (time in which an event is continued) instead of the event end time of the message format.

Another embodiment of the present invention will be described next.

FIG. 38 is a block diagram showing another embodiment according to the present invention. The arrangement shown in FIG. 38 is fundamentally similar to that of FIG. 1 excepting that a user property management function 306 is added to a data sending equipment 30 in order to manage a property value of a user of a data receiving equipment 40 which becomes a message sending destination as a function constituent. A difference between the first embodiment and the second embodiment will be described later on.

FIG. 39 is a functional block diagram showing the functions of the data sending equipment 30 more fully. Excepting that a user property management function 313 is added as a function constituent and a user property management table 314 is added to a table, the data sending equipment 30 is fundamentally similar to the data sending equipment 10 shown in FIG. 2. A difference between the data sending equipment 30 and the data sending equipment 10 will be described later on.

The detailed hardware of the data sending equipment 30 is similar to that of FIG. 3, and therefore need not be described.

FIG. 40 is a flowchart showing a main processing that is executed by a CPU in the data sending equipment 30. Except that a step 3009 for calling the user property management function 306 and which step is executed when a user property registration message receiving event occurs is added as a processing, the flowchart of FIG. 40 is fundamentally similar to FIG. 4.

The manner in which the strategy officer executes the four procedures, i.e. (1) registration of merchandise information (data), (2) registration of property item, (3) registration of term and (4) setting of strategy, in that order, similarly to the first embodiment will be described below.

The processing with respect to the (1) registration of the merchandise information (data) is similar to the flowchart of FIG. 5, and therefore need not be described.

The processing with respect to the (2) registration of the property item is similar to the flowchart of FIG. 6. However, a format of a sent message is different when the property registration message is transmitted (step 1023 in FIG. 6).

FIG. 45 shows a format of a property registration message. As shown in FIG. 45, the property registration message comprises a destination address 3151, a sender address 3152, a content code 3153, an event number 3154, a serial number 3155, a property code 3156, a property name 3157 and a property value limit 3158. While a sender address of a message is generally set in the destination address 3151, when this message expresses a broadcast (multi-address calling), "111111", for example, is set in the destination address 3151. A communication address (e.g. "000001") of the data sending equipment 30 is set in the sender address. Other items are set similarly to FIG. 17.

In FIG. 49, reference numeral 3171 denotes an example in which a property registration message is set. data receiving equipment 40 which received this property registration message returns its own user property registration message 3172 (will be described more fully later on). FIG. 46 shows a format of a user property registration message. A study of comparison with the property registration message 3171 (FIG. 45) which is broadcast by the data sending equipment 30 reveals that this user property registration message is different from the property registration message 3171 in that the property value limit 3158 is replaced with a property value 3159. In FIG. 49, reference numeral 3172 denotes an example in which a user property registration message is set. A communication address (e.g. "000001") of the data sending equipment 30 is set in the destination address 3151. A communication address (e.g. "001001") of the data receiving equipment 40 is set in the sender address 3152. This is a one-to-one communication. A property value (e.g. "TOKYO . . . ") that has been set by the user of the data receiving equipment 40 is set in the property value 3159. This user property registration message is received by the data sending equipment 30 through the communication equipment 135, and the user property management function is called (step 3009 in FIG. 40). While there is only one user property registration message 3172 in FIG. 49, the user property registration message 3172 is transmitted to the data sending equipment 30 from each of the data receiving equipment 40 which receive the property registration message 3171.

FIG. 42 is a flowchart showing the user property management function 313 called by the data sending equipment 30. The user property management function 313 identifies a user based on the sender address of the received user property registration message 3172 and sets a property item and a property value on the message in the user property management table 314 which exists at every user. FIG. 43 shows the manner in which the user property management table 314 is arranged. The user property management table 314 in FIG. 43 has similar contents to those of the user property management table 209 (FIG. 34) managed by the data receiving equipment 20 in the first embodiment.

With respect to the (3) registration of the term, FIG. 41 show a flowchart thereof. This flowchart of FIG. 41 is similar to the flowchart of FIG. 7 excepting that the sending processing of the term registration message is deleted. Specifically, the term is defined by the data sending equipment 30 and set within the term management table 311. The term is never sent to the data receiving equipment 40 as the term registration message.

With respect to the (4) setting of the strategy, the processing is fundamentally similar to the processing of the flowchart of FIG. 9. However, since the two processing shown in FIGS. 9 and 49 differ from each other a little, which difference will be described below.

In the flowchart of FIG. 9, the content code management function in the data sending equipment is called during a strategy is defined. A difference of this embodiment from the step 1043 in the flowchart (FIG. 8) of the called content code management function will be described.

The content code management function 102 according to this embodiment checks which user satisfies this strategy condition by comparing the strategy condition of the content code registered at the preprocessing 1042 and the user property management table 314 of all users. Then, the content code registration message (3173 and 3174 in FIG. 49) is sent to all data receiving equipment side users who satisfy this strategy condition in a one-to-one communication fashion.

FIG. 47 shows a format of a content code registration message. As shown in FIG. 47, a communication address of user (data receiving equipment which satisfies the strategy condition is set in the destination address 3151. A content code registration content code "001" is set in the content code 3153, and a content code which is requested to be registered is set in the content code group 3160. Specifically, on the data receiving equipment 40 side, its own user may store only a corresponding content code (number).

FIG. 49 shows an example of the manner in which the content code registration messages 3173, 3174 are set. The content code registration message 3173 indicates that a content code "101", i.e. "thirties & sex =male" is requested to be registered on the data receiving equipment of the destination address "001001".

Moreover, in this embodiment, a format of a sent message is different in the data message transmission (step 1054 in FIG. 9) in the flowchart of FIG. 9.

FIG. 48 shows a format of a data message. As shown in FIG. 48, the data message includes a destination address 3151, a sender address 3152, a content code 3153, an event number 3154, a serial number 3155 and data 3161. On the destination address 3151, there is set an address which indicates that this message is a broadcast (multi-address calling), e.g. "111111". On the sender address, there is set a communication address (e.g. "000001") of the data sending equipment 30. Other items are set similarly to FIG. 20. FIG. 49 shows an example of the manner in which the data messages 3175, 3176, 3177 are set.

The receiving equipment 40 according to this embodiment will be described next.

FIG. 50 shows a functional block diagram of the data receiving equipment 40 more fully. The functional block diagram of FIG. 50 is fundamentally similar to that of FIG. 24 excepting that the term management function 207 is deleted from the function arrangement element and the term management table 211 is deleted from the table. The difference between the functional block diagram of FIG. 50 and the functional block diagram of FIG. 24 will be described later on.

The detailed hardware of the data receiving equipment 40 is similar to that of FIG. 25, and therefore need not be described.

FIG. 51 is a flowchart showing a main processing executed by the CPU in the data receiving equipment. The flowchart of FIG. 51 is fundamentally similar to the flowchart of FIG. 26 excepting that the step 2006 for calling the term management function which is the processing executed when the term registration message receiving event occurs is deleted from the processing. A portion different from the first embodiment will be described hereinafter.

Let it be assumed that the messages 3171 to 3177 are sent from the broadcasting equipment 434 to the data receiving equipment 40 in the sequential order shown in FIG. 49, resulting in an event. Then, when the event occurred, the data receiving equipment 40 judges the kind 1of event (step 4002). When receiving a message, the data receiving equipment 40 regards the reception of the message as the message receiving event, and calls the message selective receiving function 401 (step 4003). The message selective receiving function 401 selectively receives the message.

FIG. 52 is a flowchart showing a main processing executed in the called message selective receiving function 401. The flowchart of FIG. 52 is fundamentally similar to that of FIG. 27 excepting that a first processing step 4010 is added. The different portions will be described below in brief. Referring to FIG. 52, and following the start of operation, the data receiving equipment 40 judges the destination address of the incoming message (step 4010). If the destination address is its own address or the broadcast address, then control goes to the next processing (step 4011). If not, then control goes to a message dispose processing (step 4041).

FIG. 53 is a flowchart showing a main processing executed by the user registration management function 403 in the data receiving equipment 40. A user property registration message sending processing step 4033 in FIG. 53 is added to the flowchart of FIG. 29. FIG. 46 shows a format of this user property registration message. The user property registration message in FIG. 46 is different from the property item registration message (FIG. 45) in that the property value limit 3158 is replaced with the property value 3159. FIG. 49 shows an example of the manner in which the user property registration message 3172 is set. A communication address (e.g. "000001") of the data sending equipment 30 is set in the destination address 3151. A communication address (e.g. "001001") of the data receiving equipment 40 is set in the sender address 3152. This is a one-to-one communication. On the property value 3159, there is set a property value (e.g. "TOKYO . . . ") set by the user of the data receiving equipment 40. This property registration message is sent via the I/O management function 405 through the communication apparatus to the network.

FIG. 54 is a flowchart showing a main processing executed by the content code management function 402. In this case, it is sufficient that a registration content code is simply set in the content code management table based on the received content code registration message.

In the above-mentioned embodiment, the data sending equipment side also includes the user property management table. Therefore, fundamentally, the data receiving equipment side need not include the user property management table (although the data receiving equipment side includes the user property management table as described in the above embodiment, it is clear that a content code communication will not be affected without the user property management table on the data receiving equipment side). Also, there is the advantage that a variety of market analyses can be made by using data on the user property management table. In the data sending equipment, for example, when the strategy is set, it is possible to calculate (3147 in FIG. 44) the number of users applicable to the strategy condition on the strategy set display (FIG. 44). This numerical value can be used when effects of the strategy are estimated.

Further, the user property management functions of a plurality of data sending equipment (30-1 to 30-m) according to this embodiment can be made independent as less equipment (one equipment may be possible). In this case, although a communication concerning a user property occurs between a data sending equipment an a user property management equipment, a property inquiry sent from the data sending equipment to the user decreases, thereby making it possible to alleviate a load imposed upon the user when the user answers the property inquiry.

As described above, according to the information sending and receiving method of the present invention and the information sending and receiving system using such information sending and receiving method, the intent or the strategy of the information provider on the information sending equipment side urge the user on the information receiving equipment side to selectively receive information, thereby making it possible to effectively distribute an advertisement.

Further, according to the information sending method of the present invention and the information sending equipment using such information sending method, As it is possible to realize the information sending and receiving system in which the user on the information receiving equipment side is able to selectively receive information based on the intent or the strategy of the information provider on the information sending equipment side.

Further, according to the information receiving method of the present invention and the information receiving equipment using such information receiving method, it is possible to realize the information sending and receiving system in which the user on the information receiving equipment side is able to selectively receive information based on the intent or the strategy of the information provider on the information sending equipment side.

Furthermore, according to the message format of the present invention, it is possible to realize the information sending and receiving system in which the intent or the strategy of the information provider on the information sending equipment side enable the user on the information receiving equipment side to selectively receive information.

Incidentally, while the case in which commercial/advertisement information is distributed has been described so far by way of example, the present invention is not limited thereto, and may be applied to a variety of fields such as when multimedia contents such as music CDs are distributed, assemblies information required by a branch office are distributed between a head office and the branch office in a maker and inter-office information is distributed to the persons in a large enterprise.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. An information sending and receiving system in which information sending equipment sends information and information receiving equipment receives information through a transmission medium, wherein said information sending equipment comprises:

means for creating a content code corresponding to a strategy condition for selecting a transmission destination of a data message, said strategy condition being defined by a user attribute, means for creating a content code registration message including said content code and said strategy condition, and means for transmitting said content code registration message, and a data message to which said content code is attached; and said information receiving equipment comprises:

means for receiving said registration message and said data message, means for comparing said strategy condition of said content code registration message with user attributes previously set on said information receiving equipment, and registering said content code selectively based on a comparison result of strategy condition, and means for comparing said content code attached to said data message with said content code registered based on said comparison result of strategy condition, and determining reception of said data message selectively based on a comparison result of data message.

2. An information sending and receiving system in which information sending equipment sends information and information receiving equipment receives information through a transmission medium, wherein said information sending equipment comprises:
means for receiving user attributes previously set from said information receiving equipment,
means for comparing a strategy condition for selecting a transmission destination of a data message with said user attributes, said strategy condition being defined by a user attribute, and selecting data receiving equipment having a user attribute satisfied with said strategy condition,
means for creating a content code corresponding to said strategy condition, means for creating a content code registration message including said content code, and
means for transmitting said content code registration message to said information receiving equipment selected by said comparing and selecting means, and
means for transmitting a data message to which said content code; and
said information receiving equipment comprises:
means for receiving said registration message, and said data message to which said content code is attached,
means for registering said content code based on said content code registration message, and
means for comparing said content code of said data message thus received with said content code thus registered, and determining reception of said data message selectively based on a comparison result of content code.

3. The information sending and receiving system according to claim 1, wherein said strategy condition and said user attribute are information concerning at least one of a user profile, a user preference and a user situation on said information receiving equipment.

4. The information sending and receiving system according to claim 1, wherein said strategy condition and said user attribute are information concerning registered content codes.

5. The information sending and receiving system according to claim 2, wherein said strategy condition and said user attribute are information concerning at least one of a user profile, a user preference and a user situation on said information receiving equipment.

6. The information sending and receiving system according to claim 2, wherein said strategy condition and said user attribute are information concerning registered content codes.

7. An information sending and receiving system in which information sending equipment sends information and information receiving equipment receives information through a transmission medium,
wherein said information sending equipment comprises:
means for creating a content code corresponding to a strategy condition for selecting a transmission destination of a data message, said strategy condition being defined by a user attribute,
means for creating a content code registration message including said content code and said strategy condition, and
means for transmitting a data message to which an event number and said content code are attached, said event number being provided for synchronizing with another data message during a predetermined period,
said information receiving equipment comprises:
means for receiving said content code registration message, and said data message to which said event number and said content code are attached,
means for comparing said strategy condition of said content code registration message with user attributes previously set on said information receiving equipment, and registering said content code selectively based on a comparison result of strategy condition, and
means for comparing said event number attached to said data message thus received with an event number attached to a data message already received, comparing said content code of said data message thus received with said content code thus registered, and determining reception of said data message selectively based on comparison results of event number and content code.

8. The information sending and receiving system according to claim 7, wherein said event number includes at least one of a unique number in said information sending and receiving system, an event start time, an event end time and the number of event data to be synchronized.

9. Information sending equipment for transmitting information to information receiving equipment through a transmission medium, comprising:
means for creating a content code corresponding to a strategy condition for selecting a transmission destination of a data message, said strategy condition being defined by a user attribute,
means for creating a content code registration message including said content code and said strategy condition, and
means for transmitting to said information receiving equipment said content code registration message, and a data message to which said content code is attached.

10. Information receiving equipment for
receiving information from information sending equipment through a transmission medium, comprising:
means for receiving from said information sending equipment a content code registration message and a data message to which a content code is attached, said content code registration message including said content code indicative of a content of a data message and a strategy condition for selecting a transmission destination of said data message, said strategy condition being defined by a user attribute,
means for comparing said strategy condition of said content code registration message with user attributes previously set on said information receiving equipment, and registering said content code selectively based on a comparison result of strategy condition, and
means for comparing said content code attached to said data message with said content code registered based on sad comparison result of strategy condition, and determining reception of said data message selectively based on a comparison result of data message.

11. A format of a message used in an information sending and receiving system which includes information sending equipment for transmitting said message and information receiving equipment for receiving said message through a transmission medium,
wherein said format includes a content code indicative of a content of said message and a strategy condition for selecting a transmission destination of said message, said strategy condition being defined by a user attribute,
said strategy condition is compared by said information receiving equipment with user attributes previously set on said information receiving equipment, and said content code is determined by said information receiving equipment as to whether said content code thus received should be registered in said information receiving equipment or not, based on a comparison result of strategy condition.

12. An information sending and receiving method in which information sending equipment transmits information and information receiving equipment receives information through a transmission medium, comprising the steps of:

creating, by said information sending equipment, a content code corresponding to a strategy condition for selecting a transmission destination of a data message, said strategy condition being defined by a user attribute, creating, by said information sending equipment, a content code registration message including said content code and said strategy condition, transmitting, by said information sending equipment, said content code registration message, and a data message to which said content code is attached; and receiving, by said information receiving equipment, said registration message and said data message, comparing, by said information receiving equipment, said strategy condition of said content code registration message with user attributes previously set on said information receiving equipment, and registering said content code selectively based on a comparison result of strategy condition, and comparing, by said information receiving equipment, said content code attached to said data message with said content code registered based on said comparison result of strategy condition, and determining reception of said data message selectively based on a comparison result of data message.

13. The information sending and receiving method according to claim 12, wherein said strategy condition and said user attribute are information concerning at least one of a user profile, a user preference and a user situation on said information receiving equipment.

14. The information sending and receiving method according to claim 12, wherein said strategy condition and said user attribute are information concerning registered content codes.

15. An information sending and receiving method in which information sending equipment sends information and information receiving equipment receives information through a transmission medium, comprising the steps of:

creating, by said information sending equipment, a content code corresponding to a strategy condition for selecting a transmission destination of a data message, said strategy condition being defined by a user attribute, creating, by said information sending equipment, a content code registration message including said content code and said strategy condition, transmitting, by said information sending equipment, a data message to which an event number and said content code are attached, said event number being provided for synchronizing with another data message during a predetermined period, receiving, by said information receiving equipment, said content code registration message, and said data message to which said event number and said content code are attached, comparing, by said information receiving equipment, said strategy condition of said content code registration message with user attributes previously set on said information receiving equipment, and registering said content code selectively based on a comparison result of strategy condition, and comparing, by said information receiving equipment, said event number attached to said data message thus received with an event number attached to a data message already received, comparing said content code of said data message thus received with said content code thus registered, and determining reception of said data message selectively based on comparison results of content code and event number.

16. The information sending and receiving method according to claim 15, wherein said event number includes at least one of a unique number in said information sending and receiving system, an event start time, an event end time and the number of event data to be synchronized.

17. An information sending method by information sending equipment for transmitting information to information receiving equipment through a transmission medium, comprising the steps of:

creating a content code corresponding to a strategy condition for selecting a transmission destination of a data message, said strategy condition being defined by a user attribute, creating a content code registration message including said content code and said strategy condition, and transmitting to said information receiving equipment said content code registration message, and a data message to which said content code is attached.

18. An information receiving method by information receiving equipment for receiving information from information sending equipment through a transmission medium, comprising the steps of:

receiving a content code registration message, and a data message to which a content code is attached, said content code registration message including a content code indicative of a content of a data message and a strategy condition for selecting at transmission destination of said data message, said strategy condition being defined by a user attribute, comparing said strategy condition of said content code registration message with user attributes previously set on said information receiving equipment, and registering said content code selectively based on a comparison result of strategy condition, and comparing said content code attached to said data message with said content code registered based on said comparison result of strategy condition and determining reception of said data message selectively based on a comparison result of content code.

19. The information sending and receiving system according to claim 2, wherein said information sending equipment further comprises means for previously inquiring said information receiving equipment of user attributes on said information receiving equipment; and said information receiving equipment further comprises means for answering said inquiry.

20. The information sending and receiving system according to claim 7, wherein said information receiving equipment further comprises means for comparing an event data receivable number of said data message thus received with an event data receivable number of a already received data message to which a same event number as that of said data message thus received is attached, and determining reception of said data message thus received selectively based on a comparison result of event data receivable number.

21. The information sending and receiving method according to claim 15, further comprising the step of comparing, by said information receiving equipment, an event data receivable number of said data message thus received with an event data receivable number of a already received data message to which a same event number as that of said data message thus received is attached, and determining reception of said data message thus received selectively based on a comparison result of event data receivable number.

22. An information sending and receiving system in which information sending equipment sends information and information receiving equipment receives information through a transmission medium,
   wherein said information sending equipment comprises:
      means for creating a content code for making said information receiving equipment determine abortion of a data message,
      means for transmitting a content code registration message for making said information receiving equipment create a registration lit of content codes in said information receiving equipment, and
      means for transmitting a data message to which said content code is attached; and
   said information receiving equipment comprises:
      means for receiving said content code registration message, and said data message to which said content code is attached,
      means for creating said registration list of content codes based on said content code registration message,
      means for comparing said content code attached to said data message thus received with the content codes in said registration list, and determining that said content code of said data message thus received is not registered in said registration list based on a comparison result of content code, and
      means for aborting said data message as a result of determination thus made.

23. An information sending and receiving system in which information sending equipment sends information and information receiving equipment receives information through a transmission medium,
   wherein said information sending equipment comprises:
      means for creating a content code corresponding to a strategy condition for selecting a transmission destination of a data message, said strategy condition being defined by a user attribute,
      means for transmitting an inquiry message including a strategy condition for selecting a transmission destination of a data message,
      means for making said information receiving equipment create a registration list of content codes in said information receiving equipment based on an answer message containing user attributes previously set on said information receiving equipment answered from said information receiving equipment in response to said inquiry message, and
      means for transmitting a data message to which said content code is attached by designating said information receiving equipment.

24. An information sending and receiving method in which information sending equipment transmits information and information receiving equipment receives information through a transmission medium, comprising the steps of:

creating, by said information sending equipment, a content code for making said information receiving equipment determine abortion of a data message
   transmitting, by said information sending equipment, a content code registration message for making said information receiving equipment create a registration list of content codes in said information receiving equipment, and
   transmitting, by said information sending equipment, a data message to which said content code is attached,
   creating, by said information receiving equipment, said registration list of content codes when receiving said content code registration message,
   comparing, by said information receiving equipment, said content code attached to said data message thus received with the content codes in said registration list, and determining that said content code of said data message thus received is not registered in said registration list based on a comparison result of content code, and
   aborting, by said information receiving equipment, said data message as a result of determination thus made.

25. An information sending and receiving method by information sending equipment for transmitting information to information receiving equipment through a transmission medium, comprising the steps of:
   creating a content code corresponding to a strategy condition for selecting a transmission destination of a data message, said strategy condition being defined by a user attribute,
   transmitting an inquiry message including a strategy condition for selecting a transmission destination of a data message,
   making said information receiving equipment create a registration list of content codes in said information receiving equipment based on an answer message containing user attributes previously set on said information receiving equipment answered from said information receiving equipment in response to said inquiry message, and
   transmitting a data message to which said content code is attached by designating said information receiving equipment.

26. Information sending equipment for transmitting information to information receiving equipment through a transmission medium, comprising:
   a control unit for creating a content code and a content code registration message, said content code being used for making said information receiving equipment determine reception of a data message in said information receiving equipment, and said content code registration message including said content code, and
   a transmission control unit connected to said control unit through a bus, for controlling transmission of said content code registration message and a data message to which said content code is attached.

27. An information receiving equipment for receiving information from information sending equipment through a transmission medium, comprising:
   a reception control unit for controlling reception of a content code registration message and a data message to which a content code is attached, said content code registration message including a content code indicative of a content of a data message and a strategy condition for selecting a transmission destination of said data message, said strategy condition being defined by a user attribute, and a control unit for comparing said strategy condition of said content code registration message with user attributes previously set on said information receiving equipment, and registering said content code selectively based on a comparison result of strategy condition, and comparing said content code attached to said data message with said content code registered based on said comparison result of strategy condition, and determining reception of said data message selectively based on a comparison result of content code.

28. The information sending and receiving system according to claim 1, wherein said information receiving equipment further comprises means for determining a type of a message received.

29. A method for transmitting a data message by information sending equipment to information receiving equipment through a transmission medium, comprising the steps of:

attaching to a data message a content code for making said information receiving equipment determine one of abortion or reception of said data message when said information receiving equipment receives said data message, transmitting said data message to which said content code is attached, and prior to transmission of said data message, creating a content code registration message for making said information receiving equipment create a registration list of content codes, and transmitting said content code registration message to said information receiving equipment.

* * * * *